United States Patent
Herman et al.

(10) Patent No.: US 10,558,936 B2
(45) Date of Patent: Feb. 11, 2020

(54) SYSTEMS AND METHODS FOR DYNAMICALLY GENERATING PATROL SCHEDULES BASED ON HISTORIC DEMAND DATA

(71) Applicant: Numerica Corporation, Fort Collins, CO (US)

(72) Inventors: Shawn Michael Herman, Fort Collins, CO (US); Jason Kyle Johnson, Fort Collins, CO (US); Jeffery Brian Poore, Windsor, CO (US); Philip Christopher Du Toit, Berthoud, CO (US)

(73) Assignee: Numerica Corporation, Fort Collins, CO (US)

( * ) Notice: Subject to any disclaimer, the term of this patent is extended or adjusted under 35 U.S.C. 154(b) by 324 days.

(21) Appl. No.: 15/287,682

(22) Filed: Oct. 6, 2016

(65) Prior Publication Data
US 2017/0098181 A1    Apr. 6, 2017

Related U.S. Application Data

(60) Provisional application No. 62/238,068, filed on Oct. 6, 2015.

(51) Int. Cl.
*G06Q 10/06* (2012.01)
*G06N 5/02* (2006.01)

(52) U.S. Cl.
CPC ....... *G06Q 10/06311* (2013.01); *G06N 5/022* (2013.01)

(58) Field of Classification Search
CPC ......... G06Q 10/00; G06Q 40/06; G06F 17/60

USPC ......................................................... 705/7.16
See application file for complete search history.

(56) References Cited

U.S. PATENT DOCUMENTS

| 5,911,134 A * | 6/1999 | Castonguay | G06Q 10/06 379/112.01 |
| 8,229,658 B1 | 7/2012 | Dabell | |
| 8,401,884 B1 * | 3/2013 | Kinney | G06Q 10/063116 705/7.18 |
| 8,666,795 B2 * | 3/2014 | Cameron | G06Q 10/00 705/7.16 |

(Continued)

OTHER PUBLICATIONS

Koper, Christopher S., Just Enough Police Presence: Reducing Crime and Disorderly Behavior by Optimizing Patrol Time in Crime Hot Spots, Justice Quarterly, vol. 12, No. 4, Dec. 1995 (Year: 1995).*

(Continued)

*Primary Examiner* — Romain Jeanty
(74) *Attorney, Agent, or Firm* — Finnegan, Henderson, Farabow, Garrett & Dunner LLP

(57) ABSTRACT

Systems and methods are described herein for dynamically generating and updating a patrol schedule for a shift based on historic demand event data, and a predicted-demand model based on the historic demand event data. The systems and methods also receive information associated with patrol officers assigned to a shift and constraints on the officers' availability, and generate a patrol schedule comprising patrol assignments for the assigned patrol officers optimized based on at least one policing objective. The patrol schedule may be dynamically updated based on changing information and provided to the patrol officer via mobile device or display in the patrol officer's vehicle.

14 Claims, 12 Drawing Sheets

(56) References Cited

U.S. PATENT DOCUMENTS

| | | | |
|---|---|---|---|
| 8,788,308 B1* | 7/2014 | Cox | G06Q 10/063116 |
| | | | 705/7.13 |
| 8,874,456 B2* | 10/2014 | Lakritz | G06Q 10/06 |
| | | | 705/7.12 |
| 8,949,164 B1 | 2/2015 | Mohler | |
| 9,047,768 B1 | 6/2015 | Rapp et al. | |
| 9,129,219 B1* | 9/2015 | Robertson | G06N 5/048 |
| 9,715,668 B1 | 7/2017 | Brandt et al. | |
| 9,805,311 B1 | 10/2017 | Mohler | |
| 2008/0120129 A1* | 5/2008 | Seubert | G06Q 10/06 |
| | | | 705/35 |
| 2011/0261067 A1* | 10/2011 | Trinko | G01C 21/3461 |
| | | | 345/589 |
| 2011/0291851 A1 | 12/2011 | Whisenant | |
| 2012/0256745 A1* | 10/2012 | Piett | G06Q 30/02 |
| | | | 340/540 |
| 2013/0039542 A1* | 2/2013 | Guzik | G11B 27/034 |
| | | | 382/103 |
| 2015/0066557 A1* | 3/2015 | Lichti | H04W 4/029 |
| | | | 705/7.15 |
| 2015/0066828 A1* | 3/2015 | Vepakomma | G06Q 10/04 |
| | | | 706/46 |
| 2015/0073759 A1* | 3/2015 | Vepakomma | G06Q 50/265 |
| | | | 703/6 |
| 2016/0031416 A1* | 2/2016 | Calhoun | H04W 4/90 |
| | | | 701/483 |
| 2016/0148136 A1* | 5/2016 | Ni | G06Q 10/06312 |
| | | | 705/7.22 |
| 2017/0097637 A1* | 4/2017 | Kanada | G05B 23/0278 |

OTHER PUBLICATIONS

International Patent Application No. PCT/US2016/055843 filed Oct. 6, 2016, by Numerica Corporation: International Search Report and Written Opinion dated Dec. 28, 2016.

* cited by examiner

SYSTEMS AND METHODS FOR DYNAMICALLY GENERATING PATROL SCHEDULES BASED ON HISTORIC DEMAND DATA

PRIORITY

This application claims priority under 35 U.S.C. § 119 to U.S. Provisional Patent Application No. 62/238,068, filed on Oct. 6, 2015, which is herein incorporated in its entirety by reference.

BACKGROUND

Technical Field

The present disclosure relates generally to systems and methods for dynamically generating and updating patrol schedules based on historic demand event data and other information.

Background

The United States has more than 18,000 state and local law enforcement agencies. Current budget constraints and recruitment difficulties make it ever more important for police chiefs and command staff within these agencies to leverage existing resources to achieve policing objectives. Patrol assignments must be made astutely to ensure that response-time targets are met for new calls for police assistance, timely backup is provided to police officers responding to calls when the number of officers needed for the call increases (calls that "escalate"), neighborhood policing is achieved, crime is proactively deterred, and the probability of apprehending criminals is maximized. Currently, however, police chiefs have no readily available tool to dynamically forecast demand for service from historical databases of police incident reports (i.e., reports on requests for police assistance), and then to assign patrol officers to optimally service that anticipated need.

Law enforcement agencies serve a critical role in society by providing a number of important first-responder operations ranging from health and welfare checks to priority-one response to incidents where danger to the public is imminent. As demand for police services continues to increase and agencies struggle to fill their ranks with qualified personnel, law enforcement agencies are facing a growing challenge to achieve departmental goals and meet taxpayers' expectations in the context of flat-line budgets, or even budget cuts, resulting in layoffs, hiring freezes, training cutbacks, and various other operational losses. The result is an overabundance of agencies that are highly resource-constrained and being told to "do more with less."

To address manpower and budget issues, some agencies have filled positions with citizen-volunteer programs, but not all jobs in public safety may be filled in such a manner. What is needed is a means for analyzing vast amounts of data very quickly and prescribing optimal patrol plans to maximize the utility of available resources.

Beyond the problem of constrained resources, agencies find it incredibly difficult, if not impossible, to extract timely, actionable information from large databases of historic incidents to accurately forecast demand in real-time. Without timely, dynamic information, patrol plans can be significantly inefficient, with officers driving on main thoroughfares in uncoordinated patterns through their cities or sectors with limited insight regarding how to re-plan their routes in response to service calls. With the severity of the resource constraints described above, tools are needed to help agencies achieve their objectives, such as minimizing response times to new calls and escalating calls, ensuring sufficient region revisit rates, and allowing time for community policing.

The disclosed methods and apparatus are directed to overcoming one or more of the problems set forth above and/or other problems or shortcomings in the prior art.

BRIEF DESCRIPTION OF DRAWING(S)

The accompanying drawings, which are incorporated in and constitute a part of this specification, illustrate the disclosed embodiments and together with the description, serve to explain the principles of the various aspects of the disclosed embodiments. In the drawings.

Figure 1:
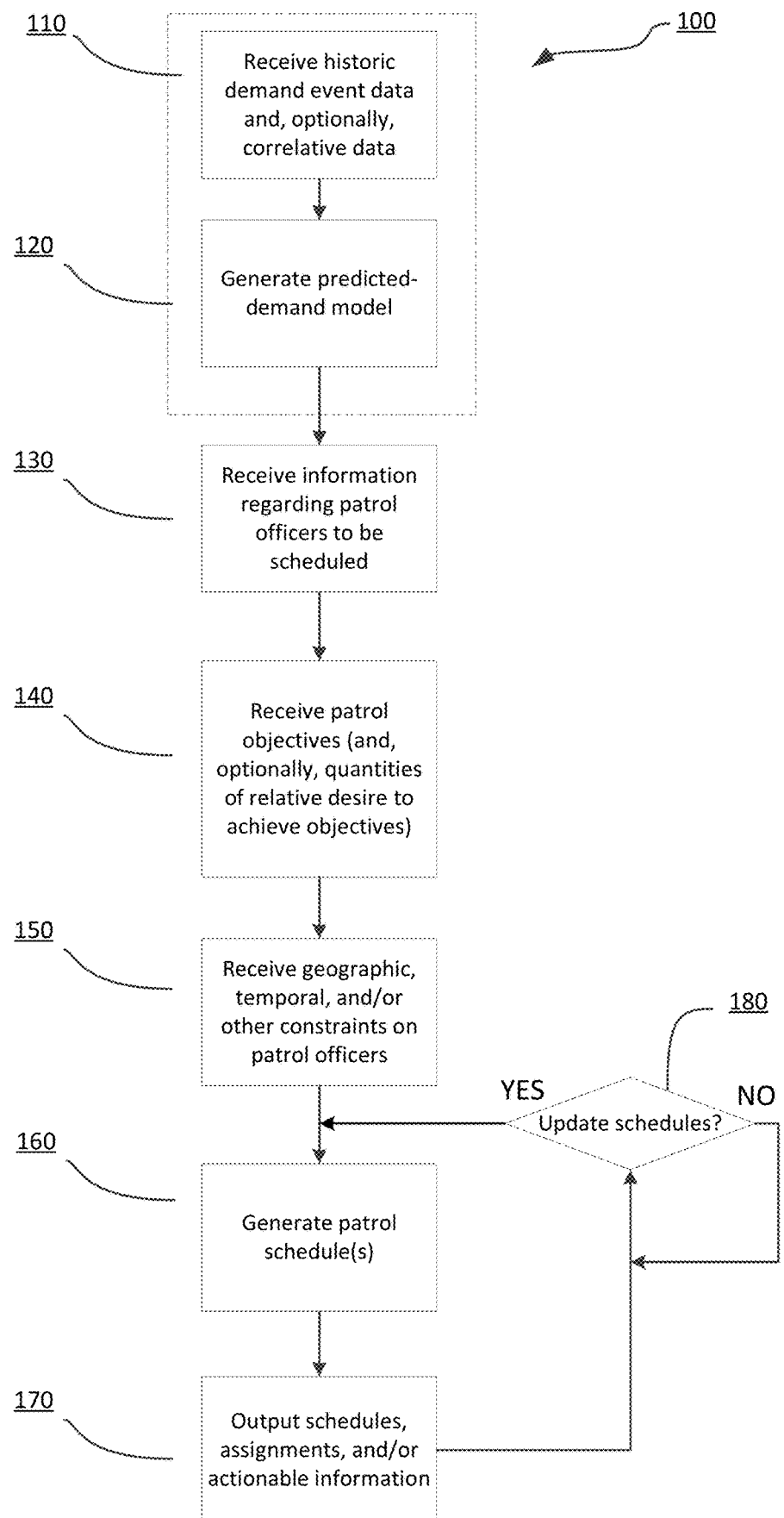
FIG. 1 is a flow diagram illustrating an exemplary method for dynamically generating patrol schedules based on historic demand event data and current event data consistent with embodiments of the present disclosure.

It is to be understood that both the foregoing general description and the following detailed description are exemplary and explanatory only and are not restrictive of the claims.

DESCRIPTION OF EXEMPLARY EMBODIMENTS

Reference will now be made to certain embodiments consistent with the present disclosure, examples of which are illustrated in the accompanying drawings. Wherever possible, the same reference numbers are used throughout the drawings to refer to the same or like parts.

The present disclosure describes systems and methods for dynamically generating patrol schedules based on historic demand event data. An event (or incident) may be any type of occurrence for which police may be called, such as for criminal activity, domestic disturbances, traffic accidents, or persons in need of assistance. Such a system may apply big-data machine-learning techniques to predict rates of calls for service in various geographic regions of a sector and then to make those predictions actionable to command staff by providing optimized assignments of officers to patrol routes within a region or sector. Feature-aided machine learning may be used to more accurately predict crime and incident rates by time, type, and location. To further improve the accuracy of the demand model, the historic demand event data may be correlated with other data relating to past events, such as the date, time of day, day of the week, month of the year, weather, zoning, demographics, traffic, public events, and the occurrence of holidays.

One source of historic demand event data may be obtained from computer-aided dispatch (CAD) data. CAD data is generated by dispatch centers when a request for police assistance is received. The data may be derived from a manual input by a call recipient and/or may be generated automatically. CAD data may comprise the geographic origin of the request for assistance, such as an address. CAD data may comprise the date and time that the request was received. CAD data may comprise the name, phone number, and/or other identifying information of the person(s) who submitted the request. CAD data may include a category for the nature of the request, such as a medical-assistance request or a burglary-assistance request. CAD data may include the priority of the request, expressed using a taxonomy defined by the police department. CAD data may include whether a situation complained of in the request occurred before the request or was occurring during the request. CAD data may include a summary of the conversation between the requestor and the call receiver. CAD data may include how many officers and, optionally, which officers were dispatched to tend to the request (e.g., by name and/or call-sign). CAD data may include the time at which each responding officer was assigned to the call (i.e., an "escalation profile"). CAD data may include the manner in which the situation complained of was resolved, such as whether an ambulance transported the requestor to a hospital or a fire was put out by the fire department. Similar and/or complementary information may also be obtained from a police department's Record Management System (RMS).

The demand model may be further improved via learning by using data directly from the local police department, rather than using a single dataset to learn a parameterized policing model, and then attempting to apply that model generically across all departments. Predictions of demand rates for police assistance in geographic areas may be displayed to users on an expected-demand map along with an optimized assignment of officers to patrol routes (i.e., schedules) for the patrol officers. The demand model may also be used to provide other types of actionable information to supervisors and patrol officers, as will be further described below.

Methods and systems described herein combine fast approaches for optimal resource allocation with data specific to the policing environment and may be used to solve for coordinated patrol schedules that optimize user-specified objectives. Methods and systems described herein may use adaptations of expectation-maximization clustering algorithms, assignment algorithms, Monte Carlo simulation of likely outcomes, and queueing-based algorithms to allow command staff to interactively schedule patrols in real-time. The patrol schedules and objective function values may be optimized using, for example, the incident event data, a predicted-demand model, street map(s), traffic model(s), and crime rates for the relevant city.

Methods and systems described herein predict demand and recommend optimal patrol assignments based on real incident data recorded by the police department. Demand for policing resources in each region may be forecasted for each particular interval in a day (e.g., hourly) during the day using CAD data. By predicting demand based on real incident data, police departments may be proactive with regard to future incidents and schedule officers to be in the right place at the right time.

FIG. 1 is a flow diagram illustrating an exemplary method 100 consistent with certain embodiments of the present disclosure. Method 100 may be performed, for example, by a service system, discussed below with respect to FIG. 9.

In step 110, the system receives historic demand event data for police presence and, optionally, correlative data. The historic demand event data may be, for example, a database of previous incidents to which police have responded. The historic demand event data may comprise, for example, records which indicate the location, times, type of incident, and/or number of personnel responding. The historic demand event data may be stored in the form of CAD data stored on one or more computer-readable media, such as in a database. Automatic weighting of historic data may be used to deemphasize older incident data or emphasize newer data within an incident-data database. Event categories may include, for example, those shown in FIG. 2B (disorder, disturbances, public welfare, domestic disputes, mental health, property crime, traffic accidents, traffic jams, threats or intimidations, juvenile activity, societal crime, quality of life issues, crimes against persons or against residences, or financial crime).

The system may also receive, as inputs, correlative data, which is additional data that may be used with the historic demand event data to determine patterns that may be useful in predicting the need for personnel presence. For example, the need for police presence may increase on certain holidays on which people celebrate in large groups, or on days when there may be parades. Police presence may also be affected by the weather or time of day (i.e. whether it is light or dark outside), which fluctuates throughout the year. Correlative data may comprise, for example, the date, time of day, day of the week, month of the year, location, weather, zoning, demographics, traffic, public events, and the occurrence of holidays. In some embodiments, the correlative data may comprise other data about the sector, such as zoning information (e.g., commercial vs. residential), type of buildings (e.g., one-family vs. multi-family, one-story vs. multi-story), and demographics of the population living in the region (e.g., average age). In some embodiments, the historic demand event data may be correlated with multiple types of correlative data to further improve the reliability of the demand model.

The correlative data may be received from one or more databases or derived from one or more databases. The traffic data, for example, may be derived from automatic vehicle location data.

Correlative data, such as event times, a road network within a geographic area, historic weather data, the date(s) of various holidays and community events, the lunar phase, and various demographic information may optionally also be provided to the system from a records management system (RMS) database. The correlative data may allow a demand modeler that performs demand forecasting to determine one or more statistical relationships between the correlative data and requests for police assistance.

The system may also receive, as an input, the current location data which represents the current location of each patrol personnel. The system may also receive, as an input, interruptability data associated with the patrol personnel. Interruptability data is a numerical value relating to the degree to which a police officer may be interrupted from his or her current task and rerouted to a new task. A police officer engaged in writing reports, for example, may be more interruptible than a police officer on an active call involving an emergency situation.

The system may also receive, as input, probability-of-escalation data associated with requests for personnel presence. In some embodiments, an escalation model may be defined and simulated. The escalation model may provide data that represents the probability that any particular ongoing incident will escalate into a situation requiring more personnel than currently assigned. The escalation model may rely on, for example, comparisons between day and night data for the same type of incidents. The escalation data may compare data for a particular incident in different types of weather (e.g. sun vs. snow) and compute the probability that an ongoing incident may require more personnel in the future. Similarly, the probability of de-escalation may also be determined and incorporated.

In step 120, a predicted-demand model is generated. The predicted-demand model generally is a prediction of how much personnel presence will be requested or needed at a given time in a given location. The predicted-demand model may be generated based on some or all of the data received in step 110.

In certain embodiments, a predicted-demand model is generated as a space-time demand model. The space-time demand model describes the occurrence of events (e.g., calls for service to the police department) over time within a region. The space-time demand model takes into account spatial variation of the rate at which calls for service arrive. Regression techniques and spatial-temporal features may be used to fit historic demand event data to predict future patterns. Cross-validation techniques may be used to select regularization parameters to decide how much to smooth the sample data to form the predicted-demand model in a manner that ensures the given sample set is not overfit.

The occurrence of events within some appropriately sized geographic region may be modeled as an inhomogeneous Poisson process with rate function $\rho(t)$ specifying the instantaneous arrival rate of events at time t (i.e., the expected number of events per second over a very short time interval). The probability of k events occurring over time interval (t1; t2) is then:

$$P(k; t_1, t_2) = \frac{\lambda(t_1, t_2)^k}{k!} \exp(-\lambda(t_1, t_2))$$

$$\text{where } \lambda(t_1, t_2) = \int_{t_1}^{t_2} \rho(t) dt$$

The expected number of events over this interval is $\lambda(t_1, t_2)$ and the standard deviation is $\sqrt{\lambda(t_1,t_2)}$.

The function $\rho(t)$ may be learned from historic demand event data. The rate of the arrival of calls for service is assumed to vary periodically over time, subject to certain fundamental frequencies governing human activity, such as one day, one week, one lunar month, or one year.

A periodic function with period $\tau$ can be represented by the Fourier series:

$$\rho_\tau(t) = c_0 + \sum_{k=1}^{m} \left\{ a_k \cos\left(\frac{2\pi k t}{\tau}\right) + b_k \sin\left(\frac{2\pi k t}{\tau}\right) \right\}$$

The parameter m specifies the number of harmonics of the fundamental frequencies present in the signal. All possible periodic signals are obtained in the limit $m \to \infty$. A finite m can be imposed to limit the highest frequency present in the signal (e.g., to the Nyquist frequency of a finitely-sampled signal). Combining these Fourier series for multiple fundamental frequencies, the following is obtained:

$$\rho(t) = c_0 + \Sigma_{k=1}^{M} \{a_k \cos(\omega_k t) + b_k \sin(\omega_k t)\}$$

where $\omega_1 < \ldots < \omega_M$ is the set of frequencies obtained by combining harmonics of each fundamental frequency (i.e., $\Omega = \{\omega_i\} = \cup_j \{2\pi k/\tau_j | k=1, \ldots, m_j\}$ and $M = \Sigma_j m_j$).

Given this set of frequencies $\Omega$, based on the fundamental frequencies $\{\tau_i\}$ and respective maximum number of harmonics $\{m_i\}$, the parameters $\theta = (c_o, a_1, \ldots, a_M, b_1, \ldots, b_M)$ are fit to the historic demand event data. It should be noted that this model is linear in the parameters, as $\rho(t) = \phi(t)^T \theta$ with feature vector $\phi(t)^T = (1, \cos(\omega_1 t), \ldots, \cos(\omega_M t), \sin(\omega_1 t), \ldots, \sin(\omega_M t))$.

Events occurring over some interval of time (0, T) (e.g., n events occurring at times ti satisfying $0 < t1 < t2 < \ldots < tn < T$) may be grouped into time bins of width dt. Let y_k denote the number of events occurring within the time bin ((k−1)dt, kdt) for k=1, \ldots, l=T/dt (assuming T is an integer multiple of dt). Let $y_k = f(n_k)$. Then, the parameters $\theta$ may be estimated so as to minimize the following weighted combination of discrepancy between the model and the data $y_k$ and a measure of model smoothness:

$$\min_\theta \{\|y - \Phi\theta\|^2 + \gamma \|L\Phi\theta\|^2\}$$

In this example, $\Phi_{i,j} = \phi_j(idt)$. L is the discrete Laplacian operator $(Lx)_t = x_t - \frac{1}{2}(x_{t+1} + x_{t-1})$. The parameter $\gamma \geq 0$ specifies prior belief that $\rho$ is a smooth function. This is a regularized least-squares problem with a solution obtained from the normal equation $(\Phi^T\Phi + \gamma\Phi^T L^T L\Phi)\theta = \Phi^T y$, i.e., $\theta = (\Phi^T\Phi + \gamma\Phi^T L^T L\Phi)^{-1}\Phi y$. Various known iterative solvers may be used to efficiently solve this least-squares problem without explicitly computing or inverting the matrix $\Phi^T\Phi + \Phi^T L^T L\Phi$.

The model described above may be modified to take into account spatial variation of the rate at which calls for service arrive. A discrete model of space may be used, described by a region graph abstraction. The overall area of interest R may be partitioned into sub-regions $R_i$, such that $R = \cup_i R_i$ and $R_i \cap R_j = \emptyset$ for all $i \neq j$. All regions may be represented by 2-D polygons. This determines a graph G=(V,E) in which the vertices $V = \{1, \ldots, r\}$ represent the regions $R_i$ and edges $(i, j) \in E$ are defined for every pair of adjacent (touching) regions. To impose spatial smoothness on the resulting demand model (thereby coupling the estimates of $\theta$ across the graphs to capture spatial correlations), an additional term may be added to the objective function as shown below.

In this example, d is the total number of features/parameters per region (d=1+2M where M is the total number of frequencies). The variable l is the number of time bins within the training interval (t1, t2). The variable r is the number of regions (the size of V), and $\Theta$ is the d×r matrix of Fourier coefficients. Each column may specify the temporal demand model within one region. $\Phi$ is the l×d matrix of Fourier basis functions. Y is the l×r matrix of observation data. L is the l×l discrete Laplacian operator. It may be defined such that $(Lx)_t = x_t - \frac{1}{2}(x_{t-1} + x_{t+1})$. The L matrix may be sparse. $L_G$ is the r×r graph Laplacian operator. It may be defined such that $$(Lx)_v = x_v - \frac{1}{|adj(v)|} \sum_{u \in adj(i)} x_u$$

where adj(v) is the set of all vertices that are adjacent to v in G (i.e., $\{i, j\} \in E$). The $L_G$ matrix may be very sparse. $\|A\|_F^2 = \Sigma_{i,j} |a_{ij}|^2$ is the Frobenius matrix norm.

The parameters may then be optimized to minimize the following least-squares objective function:

$$\min_{\theta}\{\|Y - \Phi\theta\|_F^2 + \gamma\|L\Phi\theta\|_F^2 + \gamma_G\|\Phi\theta L_G\|_F^2\}$$

The parameter $\gamma_G > 0$ represents prior belief that the activity level may be spatially smooth. This problem reduces to a least-squares problem and may be computed by direct solution of the normal equations. For large-scale problems, iterative methods that employ matrix-vector multiplication operations for the matrices $\Phi$, L, and $L_G$, defined above, may be used, and may be more efficient.

This exemplary model may be defined entirely from the training data. To evaluate the demand with respect to a user-specified set of regions within a sector and time intervals (e.g., patrol periods), there is an additional step to re-integrate the demand model defined with respect to its native regions and time steps to those requested by a user. The re-integration assumes demand is uniform within each region and time interval of the demand model.

In step 120, the predicted-demand model may also be generated using feature-aided machine learning. From a historic incident database, data may be extracted for each incident $s \in \mathscr{S}$, including the auxiliary data. The k features may be defined $x_i := \phi_i(s)$ for $s \in \mathscr{S}$, $i=1, \ldots, k$ that provide mappings of the raw data into a feature space that is believed to provide meaningful correlations with the observed incident rates. Choices for $\phi_i$ include the original data itself (e.g., location, time of day, day of the week, month of the year, type of event, etc.), categorizations (e.g., weekday, weekend, holiday), and measured quantities (e.g., snow depth in inches or temperature in degrees Fahrenheit). Ultimately, any combination of features that can possibly be correlated to incident rates may be included (e.g., hours after a professional sports team loss, school vacation days, phase of the moon, pay day for a major employer, stock indices, etc.). In this way, a feature vector $x=\phi(s)$ may be obtained for each $s \in \mathscr{S}$. Also, by averaging over an appropriate time interval, an observed incident rate, $\lambda$, associated with each feature vector x, may be computed.

Given the collection of vectors $[x\lambda]$ for each event in $\mathscr{S}$, the following sample covariance matrix may be computed:

$$\sum\nolimits_{(x\lambda)} := \begin{bmatrix} \Sigma_{xx} & \Sigma_{x\lambda} \\ \Sigma_{x\lambda}^T & \Sigma_{\lambda\lambda} \end{bmatrix}.$$

If it is assumed that $[x\lambda]$ is drawn from a multivariate normal distribution (or equivalently, if a least squares regression is performed), then the conditional distribution of $\lambda$ given x may be a multivariate normal with mean:

$$E(\lambda|x) = E(\lambda) + \Sigma_{x\lambda}^T \Sigma_{xx}^{-1}(x - E(x)).$$

To produce the incident rate, $\lambda^*$, at a future date and time, $s^*$, associated feature vector $x^* = \phi(s^*)$ may be assembled (e.g., using a weather forecast), and the maximum likelihood expected incident rate may be computed:

$$\lambda^* = E(\lambda|x^*) = E(\lambda) + \Sigma_{x\lambda}^T E_{xx}^{-1}(x^* - E(x)).$$

Accordingly, if any of the features (location, time of day, etc.) are well-correlated with incident rates, then these correlations may be used to predict future rates. In practice, it may be possible to regularize the covariance matrix to avoid over-fitting noise in the data.

These algorithms may be extended so that they provide a tool for law enforcement that scales linearly with the size of the historic incident database and/or the number of patrols to be assigned. The learning algorithm may capture and use trends, such as the number of incidents in an area steadily increasing as the local population increases (e.g., due to urbanization), to inform the predicted incident rates for individual regions. In certain embodiments, Gaussian process regression may be used to incorporate predictive models for trends in known quantities (e.g., population growth, population density, home values, income levels, etc.) to learn the effect of hidden variables. Gaussian process regression may be used to detect the influence of an underlying driver that affects the rate of incidents city-wide but may not be listed as one of the feature variables. Gaussian process regression may be used to analyze the trend behind the influence of the underlying driver. Gaussian process regression may be used to analyze the underlying driver's effect on forecasted rates of future events (i.e., incidents). Gaussian process regression is a unified non-parametric machine-learning framework that may require few assumptions on the data. A Gaussian prior probability distribution ("prior") over the space of all functions may be provided, and the data used to determine the function that provides the most likely model. Thus, the combination of the prior and the data leads to the posterior distribution over functions from which the predictions and the uncertainty in these predictions may be drawn.

The use of Gaussian distributions may simplify the calculations of posterior likelihoods since they may be computed analytically. Consequently, the learning framework may be computationally tractable. The analytical framework for Gaussian processes may provide additional insights, such as the uncertainty in the mapped values and the error in estimating the average using a small number of sample values.

Supposing that n observations $[y_1, \ldots, y_n]$ at the points $[x_1, \ldots, x_n]$ are given, the expected observation value at a new point $x_*$ may be found. The covariance function $k(x,x')$ is considered, and the covariance matrix K may be formed as follows:

$$K := \begin{bmatrix} k(x_1, x_1) & k(x_1, x_2) & \ldots & k(x_1, x_n) \\ \vdots & \vdots & \ddots & \vdots \\ k(x_n, x_1) & k(x_n, x_2) & \ldots & k(x_n, x_n) \end{bmatrix}.$$

The covariance function $k(x,x')$ encodes the "physics" of similarity between the observed data points x and x'. It describes the smoothness with which similar observation points may be expected to yield similarly mapped points. To learn the mapped value $y_*$ resulting from the test point $x_*$, the following may be computed:

$$K_* := [k(x_*,x_1) k(x_*,x_2) \ldots k(x_*,x_n)], \text{ and } K_{**} := k(x_*,x_*).$$

In certain embodiments, it may be assumed that the mapped data can be represented as a sample from a multi-variant Gaussian distribution, which is the assertion that:

$$\begin{bmatrix} y \\ y_* \end{bmatrix} \sim N\left(0, \begin{bmatrix} K & K_*^T \\ K_* & K_{**} \end{bmatrix}\right)$$

Using matrix algebra and Schur complements, it may be shown that the conditional probability $p(y_*|y)$ may also be Gaussian with mean $\bar{y}_* := K_* K^{-1} y$ and variance $\text{var}(y_*) := K_{**} - K_* K^{-1} K_*^T$. Thus, Gaussian process regression may provide an estimate for $\bar{y}_*$ when $y_*$ is conditioned on the observed data, as well as the uncertainty in that estimate through the variance, $\text{var}(y_*)$. In this way, learning and prediction of incident rates may be informed by a long-term trend or model.

In the context of Gaussian graphical model selection, the underlying relationships in the statistical model may be defined with respect to a graph in which the nodes index a collection of jointly Gaussian random variables, and edges represent conditional independence relations. In certain embodiments, to prevent over-fitting, a possible regularization is to consider only sparse graphical models; that is, learning may be regularized by preferring sparse concentration matrices (i.e., inverse covariance matrices) to reduce the degrees of freedom. In this setting, hidden variables can be modeled as contributing a low-rank component to this concentration matrix. The low-rank term provides a summary of the effect of marginalization over the hidden variables. The sum of a sparse matrix and low-rank matrix may be teased apart. The recovery algorithm may be cast as a convex program allowing for fast solution. These principles are discussed in Chandrasekaran, V., Parrilo, P. A., & Willsky, A. S. (2012, Nov. 2). 1008.1290v2.pdf [PDF]. ArXiv.org ("Latent Variable Graphical Model Selection Via Convex Optimization"), which is hereby incorporated by reference in its entirety.

In the context of law enforcement, the conditional dependence of incident rates on hidden underlying drivers that affect incident rates across many regions may be learned through a hidden variable approach and through the use of the low-rank term in Gaussian graphical model selection to identify the influence of hidden variables on the observed variables.

The hidden variable approach may be applied to provide more accurate regularization of the covariance matrix, thus enabling more accurate prediction of the incident rates conditioned on the observed variables.

The low-rank term may be used to more properly identify the influence of hidden variables on the observed variables and extrapolation of that effect forward in time may be investigated to improve incident forecasts by more accurately capturing the effect of trends in the hidden variables.

In certain embodiments, the predicted-demand model generated in step 120 may be particular to a certain geographic area. The geographic area may be, for example, a sector that police officers will patrol. Such a sector may be divided into smaller geographic sections, or "regions." In some embodiments, every point within a sector may be contained by some region. In some embodiments, the model may desire to restrict one or more patrol officers to a particular region. In some cases, it is desirable to restrict a given patrol unit to only one region at a time. In some embodiments the geographic area may be, for example, larger than the sector that police officers will patrol (e.g., the entire country). In some embodiments, the geographic area may be smaller than the sector that police officers will patrol (e.g., one region within a patrol sector).

The system may generate a map of the patrol regions with indicators for their respective predicted demand, or "region-map." These regions may be used to generate one or more patrol schedules. The system may balance the benefits and drawbacks of having regions of varying sizes. Small regions may be beneficial because they allow more precise assignment of patrols, allowing patrol officers to be closer to high demand areas and to be better dispersed than with larger regions. Having regions too small, however, may require patrol officers to learn and remember more information because there will be more regions for them to patrol. Relatedly, having regions too small may require patrol officers to spend more time travelling between regions—rather than focusing on patrolling—because there will be more regions to patrol. In certain embodiments, the regions may be, for example, polygonal.

In some embodiments, the system may generate a region map after processing certain input data. The input data may be, for example, road-network data, historical CAD data, sector boundaries, and/or boundaries of neighborhoods.

Exemplary road-network input data may constrain how patrol officers move throughout the patrol sector and how they may reach the origin of requests for assistance. Road network data may comprise speed limits and/or road categories such as highways, traffic circles, etc. The road categories may assist in the natural placement of patrol sector boundaries as a convenience for the patrol officers (e.g., a patrol officer will have an easier time remembering that a region ends at a particular highway).

Exemplary historical CAD data input may comprise the location of requests of police assistance. This data may provide a historical model for the level of demand in different regions.

Exemplary patrol sector boundary input data may comprise a large region that multiple patrol officers may be constrained to for a period of time. Each sector may be specified by a collection of regions. A police department may give patrol assignments across one or more sectors and/or across a subset of a sector.

Exemplary neighborhood boundary input data may comprise a collection of neighborhoods. In certain embodiments, a neighborhood may be specified by a collection of regions and may be smaller or larger than a sector. A neighborhood may be specified in a manner that is intuitive to patrol officers (e.g., a collection of regions that specifies a particular district within a city).

In some embodiments, the system may process input data by partitioning each sector into subregions. Subregions are the largest regions that are spatially connected, are connected by a road network, do not cross major roadways, and do not cross neighborhood boundaries. Subregions may be divided into atoms. Atoms are the smallest allowed indivisible part of a subregion. A subregion may be divided into atoms by mapping the origin of requests for assistance (event origins) in the historic demand event data to the nearest point on the road network and then clustering these points on the road network to determine a collection of atoms (e.g., using the procedure described in the following paragraph).

Clustering of points (e.g., event origins) on the road network may be accomplished as follows. A set of points, termed centroids, are initialized (possibly at random). These points are then iteratively refined so as to best partition the point set to be clustered. At each iteration, we alternatively (1) assign each point to its nearest centroid in the road network according to the minimum drive-time path between the point and that centroid and (2) re-assign each centroid to the location in the road network that minimizes the total drive-time to all of the points assigned. This procedure may continue until the centroids converge to a fixed-point solution. This results in a set of centroids and an assignment of points on the road network to those centroids. This solution may then be used to segment the road network into a disjoint component for each centroid, by assigning each point on the road network to its nearest centroid. This solution can also be used to partition the entire region under consideration into subregions, by assigning every point of the region to its nearest point on the road network and then looking up which centroid that point on the road network is assigned to. All points that map to the same centroid are then considered to be in the same subregion.

In certain embodiments, the system may generate an atom graph using the combination of polygonal regions. In the atom graph, each node of the graph may be a single atom and the graph edges may be defined for each pair of touching atoms. Each atom may be assigned a weight, specified by combing the relative area and relative demand for each atoms (i.e., let $$w_v = \left(\frac{m_v}{M}\right)^\rho \cdot \left(\frac{a_v}{A}\right)^{1-\rho}$$

where $M = \Sigma_v m_v$, $A = \Sigma_v a_v$, $m_v$ is the number of events assigned to atom v, and $a_v$ is the geographic area of atom v). The parameter $\rho \in [0, 1]$ specifies preference for weighting by event counts relative to weighting by geographic area. Each edge (u, v) may be assigned a weight $l_{u,v}$ equal to the relative length of the boundary between the two linked atoms (i.e., the length of the boundary divided by the total length of all boundaries in the sector).

In certain embodiments, defining patrol regions may be accomplished through graph partitioning the atom graph. The atom graph may be optimally partitioned into n subgraphs specified by the atom sets $R_1, \ldots, R_n$. Where R is a subset of atoms, $w(R) = \Sigma_{v \in R} w_v$ denotes the total weight of all atoms contained within the region. $l(R) = \Sigma_{(u,v): u \in R, v \notin R} l_{u,v}$ denotes the total length of the boundary enclosing the region. The system may minimize the objective:

$$f(R_1, \ldots R_n) = \sum_{i=1}^{n} \frac{w(R_i)}{\ell(R_i)}$$

Doing so chooses a balanced set of compact regions with minimal boundary lengths. In certain embodiments, each region may be connected in the road network so patrol officers may travel between any two road nodes in the region without having to leave the region. In certain embodiments, the ratio of the largest region weight to smallest region weight is below a user-specified factor. A demand model may then learn on this set of regions as previously described.

In certain embodiments, this algorithm may be optimized using the spectral graph bisection method based on the graph Laplacian matrix. This method may split a single region into two regions and is based on the second eigenvector of the graph Laplacian matrix. The graph Laplacian matrix is formed using edge weights given by the relative boundary length $l_{u,v}$ between atoms and normalized by the node weights $w_v$. For each sector, a range of solutions may be generated with a varying number of patrol regions $n=1, \ldots, N$, where N may be the user-specified maximum number of allowed regions. These solutions may be generated by a greedy algorithm using split, merge, and swap procedures. The split procedure bisects a single region into two smaller regions using the spectral bisection method, thereby increasing the number of regions by one. The merge procedure combines two adjacent regions into a single larger region, thereby decreasing the number of regions by one. The swap procedure merges a pair of adjacent regions and splits the resulting region by spectral bisection. This optimizes the boundary between two contiguous regions, moving some atoms from one region to an adjacent region. The set of solutions may be initialized by taking the entire sector to be a single region (e.g., the union of all atoms in the sector). Split, merge, and swap procedures may be applied to generate new solutions and/or refine the existing solution set as long as there exists a feasible move that preserves all constraints and that improves the objective for some value of n. The procedures may terminate once a complete set of solutions for $n=1, \ldots, N$ has been generated and no further improvement within this solutions set can be achieved by applying a single move. In certain embodiments, this search heuristic may be improved by maintaining the K—best solutions for each n and iteratively applying the procedures to this expanded solution set until no further improvement can be achieved. This approach may provide the user with alternate solutions to choose from for each n that are nearly optimal from the perspective of the optimization objective.

Various types of regression analysis have been described with respect to step 120. One of skill in the art will recognize that other types of regression analysis may be performed.

Figure 2A:
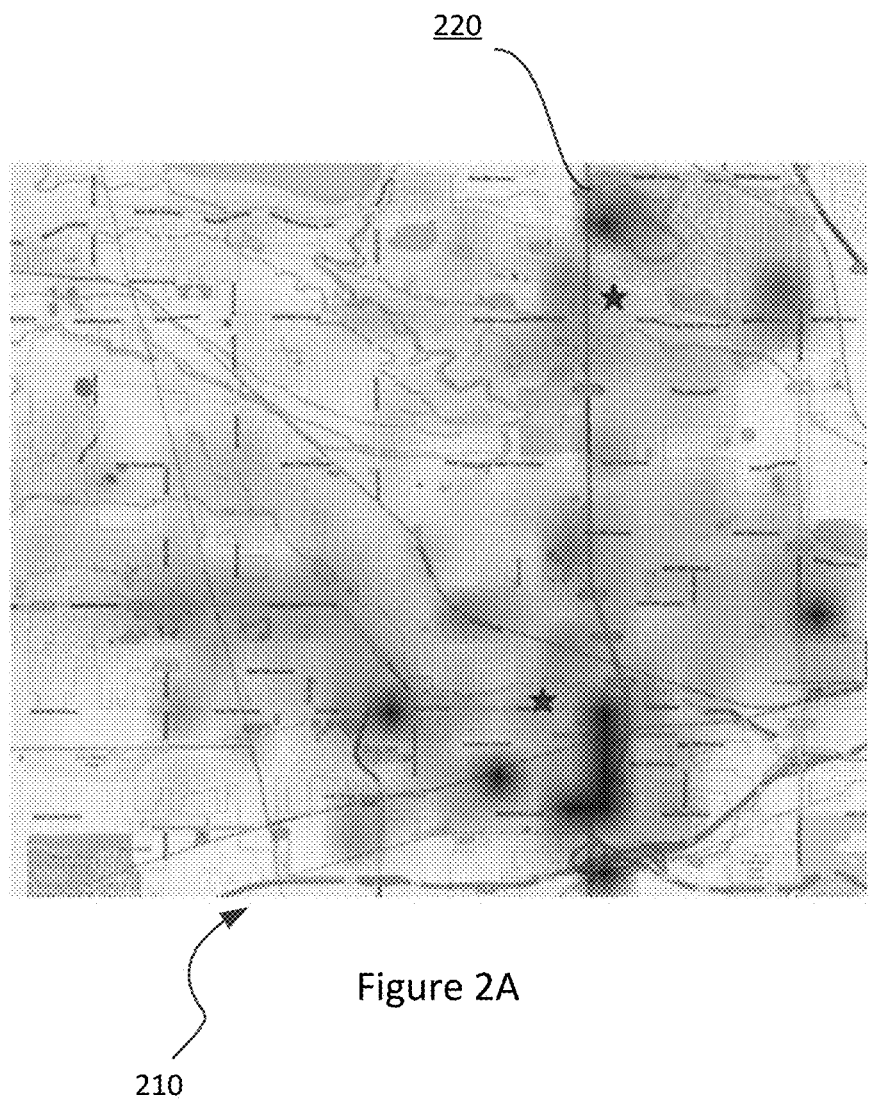
FIG. 2A illustrates a first exemplary expected-demand map.
Figure 2B:
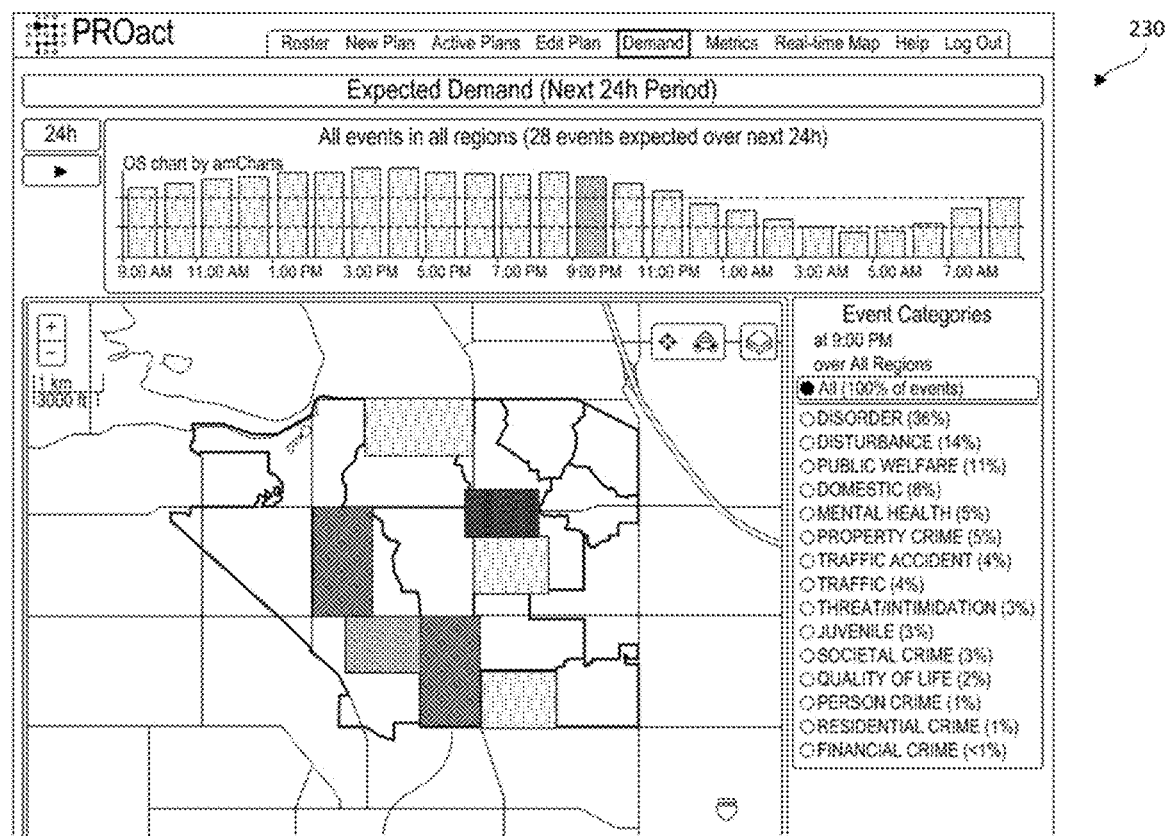
FIG. 2B illustrates a second exemplary expected-demand map.

In certain embodiments, predictions of demand rates for police assistance in geographic areas may be displayed to users on an expected-demand map, such as exemplary expected-demand map 210, as illustrated in FIG. 2A. The map may have different colors or shadings, such as shading 220 on expected-demand map 210, to indicate the predicted demand rate at a given geographic point. Another exemplary expected-demand map is illustrated in FIG. 2B as expected-demand map 230. In expected-demand map 230, a larger geographic region 240, rather than a point, is shaded in a manner that indicates the predicted demand rate (e.g., with darker shading indicating a higher predicted demand rate).

In step 130, the system receives information regarding patrol officers to be scheduled. The information may be provided, for example, by a supervisor by way of manual entry. In some embodiments, some or all of the information provided may be indicated by way of selecting information from choices displayed on a screen. The information may also be provided, for example, by receiving personnel information from a personnel database. The information received may include such information as the names of personnel, rank, desired shift hours, constraints on shift schedule for a particular day or other time period, and/or any limitations on abilities. In some embodiments, the patrol supervisor may indicate patrol officers for which the system should generate patrol schedules. In some cases, the system may generate patrol schedules for all officers, or at least all officers designated as active for a particular time period.

In step 140 the system may receive patrol objectives and, optionally, quantities of relative desire to achieve patrol objectives. The patrol supervisor may select patrol objectives to prioritize from a list of patrol objectives, such as minimizing backup response time or increasing neighborhood policing. Optionally, the patrol supervisor, upon selecting multiple objectives, may assign a quantity of his or her relative desire to achieve each selected objective. These selections may be factored in when optimizing the personnel assignments. The patrol supervisor may assign one or more quantities to his relative desire to achieve various patrol objectives, and, in certain embodiments, adjust these relative quantities for various patrol objectives and view the manner in which the outputted patrol schedule changes to reflect the changes in the relative quantities of desire for achieving the patrol objectives.

In step 150 the system may receive geographic, temporal, and/or other constraints on patrol officers. These parameters represent constraints or conditions to be factored in when optimizing the personnel assignments. One exemplary constraint may be, for example, that a desired patrol location have at least one patrol person at all times. Another exemplary constraint may be that a particular patrol person be at a desired location at a particular time.

Figure 3:
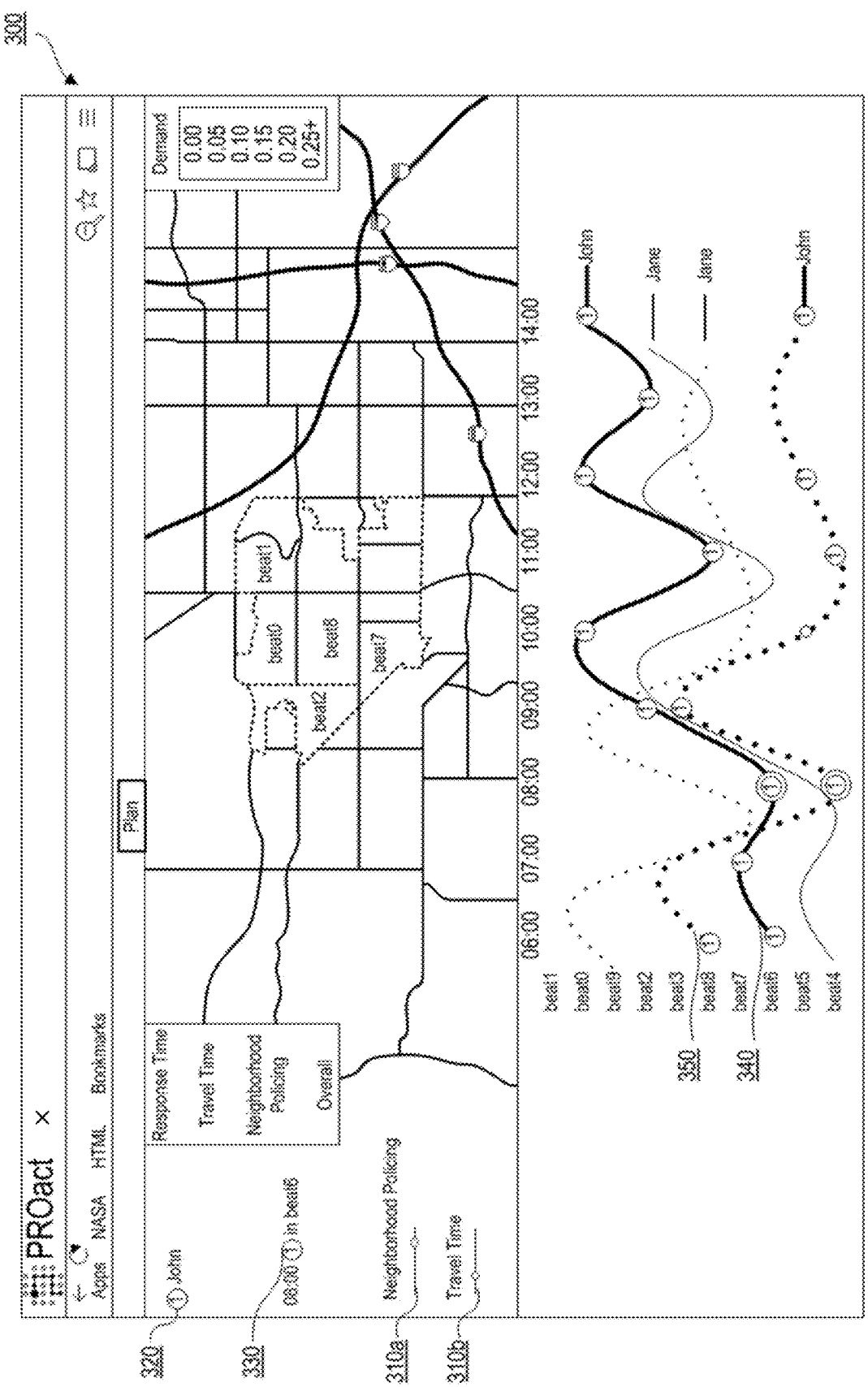
FIG. 3 illustrates an exemplary patrol schedule display.

FIG. 3 is an example of screenshot of an exemplary patrol schedule display 300. Exemplary patrol schedule display 300 may contain various selectors for manipulation by a user. The user may assign a number and color to a patrol officer using selector 320 and assign the officer to patrol a particular region at a particular time or be physically present in a particular region at a particular time using selector 330. Exemplary display patrol schedule 300 may contain sliders 310a and 310b with which the user may assign one or more quantities to his desire to achieve various patrol objectives.

In step 160, the system generates at least one patrol schedule. A patrol schedule comprises one or more assignments. An assignment may correspond to an individual patrol officer, or a team of two or more patrol officers. A patrol schedule may be generated for a particular shift, where a shift is a specific time block, such as eight hours. A patrol schedule may be generated for a shorter period of time and updated dynamically throughout a shift.

In general, an optimized patrol schedule is generated by solving the problem:

$$\operatorname*{minimize}_{\sigma \in S} f_\lambda(\sigma) \quad (1)$$

where $f_\lambda$ is an objective function, $\sigma$ is an optimal patrol assignment schedule, and S is the space of all feasible schedules. In summary, the police patrol problem may comprise accurately estimating $\lambda$ (demand forecasting) and finding the optimal patrol assignment schedule $\sigma$ by solving (1) (optimal patrol routing).

The underlying scheduling problem may be used to determine the optimal patrol schedule, $\sigma$. Schedule $\sigma$ may assign each officer $i \in \mathcal{O}$ to a region $n \in \mathcal{N}$ at each time $t \in \mathcal{T}$. In certain embodiments, a decision variable may be the response policy, the policy that determines which officer should respond to an incident when it occurs. The forthcoming incorporates the standard police practice of sending the nearest available officer.

The variable, $\mathcal{O}$, represents the set of police officers that are on-duty and responsible for patrolling a set of regions, $\mathcal{N}$. The set, $\mathcal{T}$, represents times during the upcoming shift at which officers may be reassigned (e.g., regular intervals in time). The system calculates an assignment schedule, $\sigma_t: \mathcal{O} \rightarrow \mathcal{N}$, of officers to regions for each time $t \in \mathcal{T}$ that is optimal for the specified objectives as described above with respect to step 140. The complete schedule for all $t \in \mathcal{T}$ is denoted simply by $\sigma \in S$, where S is the space of all feasible schedules.

Provided is matrix D, in which element $D_{ij}$ is the travel time between regions $i,j \in \mathcal{N}$. These travel times may be computed using optimal routing algorithms that consider the actual road network and typical travel speeds at the relevant time of day and day of the week along individual road segments. In certain embodiments, a travel-time model, such as a model using historical automatic vehicle location (AVL) data of actual police patrol, road network data (including, for example, speed limits and road categories), patrol sector boundaries, region boundaries, and/or neighborhood boundaries, may be used. AVL data may be collected from any police department or the particular police department seeking to use the data. Models may vary based on the time of day, day of the week, month of the year, may reflect effects such as slow-downs at intersections, average slow-down time at traffic lights, stop signs, or turns. Such models may reflect asymmetrical travel times (e.g., rush-hour traffic with congestion in one direction of travel but not in the opposite direction). Automatic weighting of historic data may be used to deemphasize older data or emphasize newer data. Exponential-weighting may be used to weight transits that are closest to the desired time of day to apply temporal smoothing and help guard against the sparsity of data at some times in the historical data. A sector may be partitioned into polygonal regions and a matrix of region-to-region drive times created. This matrix may be used to generate patrol schedules.

The selection and optimality of patrol schedule $\sigma$ may be guided by various additional data. Updates to a database of incidents, $\mathcal{D}$, that may contain data comprising records may be provided regularly (e.g., daily, hourly, or real-time) from a database or memory with data (e.g., CAD data). Each incident $s \in \mathcal{D}$ may be marked with pertinent information such as time, location, incident type, incident priority, number of responding officers, and/or duration of the incident. Incidents are also cross-referenced with auxiliary data such as city zoning type, weather data (temperature, precipitation, snow depth, wind speeds, etc.), census data (population demographics, density, income levels, etc. for the incident location), traffic conditions, special event data, etc. A goal may be to use machine-learning techniques to correlate the auxiliary data with incident rates and use those correlations to provide accurate forecasts of future demand for law enforcement services.

In exemplary embodiments, a patrol schedule, $\sigma$, may be chosen so that police objectives are optimized. Various objective functions are considered below, although any other objective may be chosen.

A first exemplary objective may be to minimize total response time. The total response time is some variation of the sum of the time it takes patrol officers to respond to requests for assistance (i.e., incidents) during a particular period of time. Supposing that the assignment, $\sigma$, of officers to patrols is fixed and that it is possible to predict the set, $\mathcal{E}$, of all future incidents that will occur before the end of the current schedule horizon, along with their exact location, timing, duration, and number of officers required to respond, then it may be possible to deterministically compute the cumulative response time, R, for the future period of interest by "playing" the sequence of events against the given patrol assignment. During the simulation, officers may be called upon to respond to calls and thereby become unavailable to service future calls until the incident duration expires. Whenever an incident occurs, the travel time, $r_e$, required for the first available responder to respond for each incident $e \in \mathcal{E}$, may be recorded. Each incident may be assigned a weight $w_e$ to indicate its priority. The total weighted response time may then be computed as $R = \Sigma_{e \in \mathcal{E}} w_e r_e$.

The assignment of officers may be chosen so that R is minimized.

The set of future incidents $\mathcal{E}$, may not be known a priori, however, it may be possible to sample plausible future events by using the historical database $\mathcal{D}$ to predict the rates at which incidents will occur (and the number of officers required) for each region as a function of time. The system may model the occurrence of incidents at each region (or geographical region) $j \in \mathcal{N}$ as an inhomogeneous Poisson process with time-varying rate parameter $\lambda_j(t)$. Then, the number of events, $n_j(t_a,t_b)$, to occur at region j between times $t_a$ and $t_b$ may be a Poisson random variable with parameter $m_j(t_a,t_b)=\int_{t_a}^{t_b}\lambda_j(t)dt$. The role of demand forecasting may be to use the historical data to accurately predict $\lambda:=\{\lambda_j(t): j\in\mathcal{N}\}$ for times t over the current scheduling horizon.

Another exemplary objective may be to maximize neighborhood policing. Neighborhood policing comprises maximizing the amount of time a given patrol officer patrols in a single region, without specifying which region this will be. Police supervisors may want to promote neighborhood policing to proactively deter crime, not just respond to it. Neighborhood policing may deter crime because patrol officers become familiar faces within their assigned regions and may more readily spot unusual changes that may indicate a need for policing action (e.g., a broken window or unusual traffic congestion). For this reason, a total latency term, $l_j$, that accounts for the time that has accumulated since a patrol officer last visited region $j\in\mathcal{N}$ may be included for each region. In certain embodiments, during periods when the region j is not patrolled, latency may accumulate over time at a rate proportional to the expected rate of incidents, $\lambda_j(t)$. Conversely, while an officer is assigned to actively patrol the region, the latency may decrease over time at a rate inversely proportional to the region area, $a_j$, until the latency reaches zero. Minimizing total latency, $L:=\Sigma_{j\in\mathcal{N}} l_j$ (evaluated at the end of the schedule horizon), thus may promote agile neighborhood policing to proactively deter crime. In some embodiments, the latency counter for the region may be reset to zero if a patrol officer spends a minimum amount of time in the region within a preceding period of time (e.g., during the last hour) and/or services a call in the region. In some embodiments, until the counter is reset, its value may continue to increase.

Another exemplary objective may be to maximize the time a given patrol officer spends in a specified region or regions. This may be helpful if police supervisors want to ensure that each officer is assigned to that officer's preferred subset of neighborhoods and/or regions. This may foster neighborhood policing and improve the morale of patrol officers. In some embodiments, to maximize the time a given patrol officer spends in a specified region or regions, an assignment matrix C—in which element $C_{ij}$ gives the cost of assigning officer $i\in\mathcal{O}$ to patrol region $j\in\mathcal{N}$—is presented. In certain embodiments, the cost may be lower (e.g., zero) if the assignment is preferred, and positive if the assignment is to be discouraged. In certain embodiments, patrol officers may be assigned to patrol only regions within a particular sector.

Another exemplary objective may be to minimize the distance a patrol officer must travel between patrols of different regions. This allows patrol officers to be more efficient in their patrols and the police department to save on gasoline and vehicle wear expenses. To minimize the distance a patrol officer must travel between patrols, a cost matrix A in which element $A_{ij}$ provides any additional cost or preference (e.g., travel time, specialized training, etc.) for police officer i to relocate to region j may be used, and then the cost incurred by region reassignments in the patrol schedule may be minimized.

Another exemplary objective may be to minimize the backup response time. Patrol supervisors may want to minimize the average backup response time for escalating calls (e.g., calls that require additional police officer backup while the original officer handling the matter tends to the call). The model for minimizing backup response time may be learned from CAD data. This model may be defined by parameters. One exemplary parameter is the number of officers immediately assigned to each call. This may be a non-random constant for every call and set to 1 for all categories. Another exemplary parameter is the mean number of additional officers to be dispatched to the call. This may be an actual number modeled as a Poisson random variable. Another exemplary parameter may be the mean time preceding each escalation event per additional officer assigned to patrol, where actual times are modeled as independent, identically distributed exponential random variables. Another exemplary parameter may be the mean time preceding each de-escalation event per officer released from an assigned patrol, where actual times are modeled as independent, identically distributed exponential random variables. The model may be trained per category of events, such as financial crime or burglary. This model for minimizing backup response time may be integrated into the predicted-demand model, as described with respect to step 120.

Another exemplary objective may be to minimize assignment volatility. Assignment volatility is the measure of how long patrol officers have to reach and patrol an assigned region before they are assigned a new region to patrol. Patrol supervisors may want to minimize assignment volatility in order to increase patrol officer's efficiency (e.g., minimize the amount of time traveling to a new assignment relative to actually fulfilling assignments). In certain embodiments, this may be achieved by associating a quantitative penalty with every reassignment. The penalty for reassigning a patrolling officer, or an officer travelling to a region, to another region may decrease exponentially once the officer has patrolled a single region for a minimum amount of time. This minimum time may be preset and fixed or may vary throughout a shift with the availability of new information).

Another exemplary objective may be to maximize the patrol in apprehendable-event regions. An apprehendable-event is one in response to which nearby officers may initiate a response without a call for service, such as, for example, public crimes, including trespassing, vehicular theft, and/or vandalism. Patrol supervisors may want to maximize the amount of time patrol officers spend in regions with predicted apprehendable events. This may be accomplished by associating a quantitative reward with each assignment to a region where the events predicted by the predicted-demand model are categorized as apprehendable. The quantitative reward may be proportional the quantity of predicted apprehendable events.

Another exemplary objective may be to take account of the probability of patrol officers being "interruptible" from their current task when assigning patrols to other officers. For instance, when patrol officers write reports their cars, their "interruptability" may be high and the algorithm will minimize the penalty of reassigning these officers.

Another exemplary objective may be to take account of the expected deterrent effect of a given patrol assignment. A deterrent effect may be present when a certain geographic area is more prone than others to crime deterrence when a patrol officer is present and/or for some time after the patrol officer was present.

In certain embodiments, an optimal patrol assignment schedule that optimizes multiple objectives may be generated by solving an expectation-maximization problem. $\{f_i: S\rightarrow R, i=1, \ldots, s\}$ may denote the set of s objective functions. These multiple objective functions may be combined into a single objective function, $f: S\rightarrow R$, by considering a weighted linear sum of these objectives, expressed as a multiple objective function:

$$f(\sigma):=\Sigma_{i=1}^{s}\omega_i f_i(\sigma).$$

Police commanders can specify the weights $\omega_i$ in order to prioritize the objectives according to their importance. In certain embodiments, the sum of all $\omega_i$ may equal to 1. The optimization problem to be solved may be expressed as:

$$\underset{\sigma \in S}{\operatorname{minimize}} f(\sigma)$$

In some embodiments, $f$ may be found by starting with a random initial guess for the patrol assignment, $\sigma$. For the current choice of the patrol $\sigma$, a discrete event simulator may be used to determine the expected actions of the officers given that patrol assignment. Given that each officer must perform the actions previously computed, the optimal patrol assignment, $\sigma$, to achieve those options may be determined. The optimal patrol is determined by solving a two-dimensional assignment problem (e.g., officers to regions). The use of a discrete event simulator to determine the expected actions of the officers given the patrol assignment $\sigma$ and solving a two-dimensional assignment problem may be repeated until the patrol assignment, $\sigma$, converges.

Various techniques may be used to implement optimal patrol routing. In certain embodiments, an extension to expectation-maximization clustering methods for efficiently solving the optimal patrol scheduling problem may be used. One such extension is the use of a Discrete Event Simulation (DES) to explicitly observe the officer dynamics for Monte Carlo samples over the underlying Poisson process. The DES may be implemented using a priority queue of incidents to which officers may be assigned and thereby become unavailable to respond to other calls.

At a fixed time t, the following exemplary DES-Clustering algorithm may be used to find the optimal assignment $\sigma_t$ of m officers to n regions. Given a set $\mathcal{N}$ of regions to patrol, and a set of forecasted rates $\lambda$, $\lambda$ may be used to prepare multiple sample sets $E_i$, i=1, ..., k of future events, m regions in $\mathcal{N}$ randomly chosen and officers assigned to patrol these regions. While not converged, given current assigned patrols, the DES may be applied to the sets $E_i$ of future incidents to determine $p_{ij}$, the expected number of times that officer $i \in \mathcal{O}$ will be required to respond to an incident in region $j \in \mathcal{N}$. In certain embodiments, while not converged, given $p_{ij}$, for each officer $i \in \mathcal{O}$, the number of responses that were made to each region is considered, and a new region for officer i to patrol that minimizes the objective function $f_\lambda$ (total response time and assignment costs) is chosen.

In certain embodiments, an optimal patrol assignment schedule that optimizes multiple objectives may be generated by specifying a margin parameter $\Delta f_i$ that determines the allowed tolerance to the degradation of the objective $f_i$ to achieve improvements in lower-priority objectives (e.g., how much a shift supervisor is willing to compromise a higher-ranked objective if doing so optimally improves chances of fulfilling lower-ranked objectives). In some embodiments, patrol supervisors or command staff may provide a ranking of objectives. The multiple ranked patrol objectives may be defined as $\{f_i : S \to R, i=1, \ldots, s\}$. A solution that falls in the set of $\Delta$-optimal solutions may be sought. $S_o$ may denote the set of all possible patrol plans. For i=1, ..., n, $$S_i = \{\sigma \in S_{i-1} | f_i(\sigma') + \Delta f_i \text{ for all } \sigma' \in S_{i-1}\}.$$

If $S_i$ is the empty set, then patrols in $S_{i-1}$ for which $f_i$ is a minimum is may be added to $S_i$. A solution in the final set $S_n$ may be an acceptable patrol plan. Further optimization over this set may be accomplished by taking the solution that minimizes the top-ranked objectives. In an embodiment, lower-ranked objectives may be minimized when there are ties until a unique solution is obtained.

In certain embodiments, an approximate solution may be obtained through a heuristic approach. A large number of weight vectors $\omega$ may be sampled over the s-dimensional simplex. One approach may generate uniform random samples over the simplex. Other approaches may employ low-discrepancy sampling methods (e.g., quasi-Monte Carlo) or may seek a uniform distribution over the Pareto frontier of the multiple objective functions. A fixed-weight solver may be used to generate one or more solutions for each weight vector and take $S_o$ to be the set of all solutions found in this manner for any of the weight vectors. This reduced set of candidate solutions may be processed as described above.

In some embodiments, command staff may specify the objective function, $f_\lambda : S \to \mathbb{R}$, by specifying weights for each of these objectives. The subscript $\lambda$ in $f_\lambda$ emphasizes that evaluation requires the forecast of the incident rates during the planning interval for each region. This problem may be NP-hard because it includes the NP-hard facility-location problem as a subproblem.

The algorithm may reduce the number of iterations necessary to achieve convergence. Analytical expressions may also be derived for the values of $p_{ij}$. This approach may be accomplished by solving an implicit system of non-linear equations in $p_{ij}$. The analytical approach may be accomplished with an assumption of independence between the $p_{ij}$ variables that may be violated. These dependencies in the joint distribution may be captured by the DES through direct sampling.

In certain embodiments, DES-clustering algorithm may provide optimal patrol solutions for cities on the order of 100 regions and 10 on-duty patrol officers.

Other techniques of algorithm acceleration may include, but are not limited to, 1) algorithm parallelization, 2) quasi-Monte Carlo sampling, and 3) exploitation of covariance decay.

In certain embodiments, the algorithm may be parallelizable, and a multi-threaded version of the algorithm may accelerate it. For example, Monte Carlo simulations in the DES-clustering algorithm may each be run independently. Multiple solution trials for randomly chosen initial guesses (to ensure the solver calculates across the global optimization space) may be run independently Law enforcement personnel may access the demand modeler and patrol planner via, for example, a web application that connects to a service running in the cloud. The cloud computing software platform may assist in implementing massive parallelization regardless of the computer hardware actually used by the end-user.

In certain embodiments, the DES-clustering algorithm may use Monte Carlo sampling to compute the expected value of the objective function (total response time, for example) for a given choice of patrol assignments and accelerate the algorithm. Each Monte Carlo sample, $\xi$, may be a realization of an inhomogeneous Poisson process—the occurrence of incidents at each region j according to a time-varying rate $\lambda_j(t)$.

Given space in which $\xi$ lives, $n_j$ denotes the number of events (Poisson distributed) that occur at region j between times $t_a$ and $t_b$. Then, $\xi$ may specify at each region a sequence of ordered times from the ordered simplex:

$$\Delta^{n_j} = \{(t_1, \ldots, t_{n_j}) \in R^{n_j} | t_a \leq t_1 \leq \ldots \leq t_{n_j} \leq t_b\}.$$

The DES-clustering algorithm for optimal patrol assignment may compute the expected value of the objective function by sampling from this space. Acceleration in convergence of this estimate (from $O(1/\sqrt{N})$ to $O(1/N)$) may be achieved by, for example, choosing sample sequences with low discrepancy using quasi-Monte Carlo sampling techniques.

In some embodiments, Quasi-Monte Carlo sampling methods may be used for faster convergence of the solver. For example, importance sampling on Latin hypercubes may be used to draw the number of events, $n_j$; Holton sequences with accept-reject may be used to sample from the simplices, $\Delta^{n_j}$. One may also, for example, sample simplices that cast the problem as the relaxation of an integer quadratic program.

The sampling process was previously characterized for certain embodiments as sampling from a product of simplices—one simplex for each region. In some embodiments, as the number of regions increases, the activities of police officers at very distant regions in a large network may be effectively independent. The strength of covariance may decay with distance across the network. The region graph may be decomposed into subgraphs where the interaction between subgraphs is only at the boundaries, and simulation of each subregion may proceed on parallel processes, with communication between the processes required only for the shared boundary regions; that is, activities of the officers in a shared boundary region may be communicated between the corresponding neighboring processes, but all the activities of the officers within the region may be computed locally.

In certain embodiments, covariance decay across the region network may bear further implications for quasi-Monte Carlo sampling. The number of required samples to achieve convergence may be reduced by, for example, exploiting the fact that sample incident times chosen for very distant regions may be taken as exact duplicates without harming the variability across the sample. This reduced number of samples may be constructed while maximizing discrepancy.

In step 170, the system may output schedules, assignments, and/or actionable information. Actionable information may be, for example, information about the patrol region as a whole, persons of interest in the region, addresses of frequent criminal activity, or types of incidents likely to occur in the region. In some embodiments, the actionable information displayed may be determined based on the location of the patrol officer or the patrol officer's vehicle, as determined by location acquisition systems, such as GPS. The schedules, assignments, and/or actionable information may be output in, for example, printed form or electronically displayed on a display device. In some cases, the output may be rendered to multiple output devices, such as to a display device and to speakers to output accompanying audio.

In some embodiments, the schedule for all patrol officers for a particular shift may be outputted in one chart. This type of schedule may be useful when updates to the patrol schedule are not available. In some cases, for example, patrol officers may not have connectivity to the system to be able to receive updates.

In some embodiments, the schedules, assignments, and/or other actionable information may be outputted to one or more displays. The system may send all of the patrol assignments to a supervisor's display. Alternatively, or in addition, the system may send individual patrol assignments to the displays associated with particular officers, such as a display in a patrol vehicle associated with the patrol officer or to the display of the patrol officer's mobile device.

FIG. 3 is an example of an optimized patrol schedule display 300 for a particular sector. Exemplary patrol schedule display 300 has an upper map portion showing the patrol sector and the various patrol regions within the sector. Patrol schedule display 300 also has a lower portion showing a graph of the patrol assignments of two exemplary patrol officers. Each solid line represents an assignment for one officer. Each dotted line represents the assignment for each officer prior to the various constraints represented by sliders 310a and 310b being imposed. The x-axis represents the hours in a shift. The y-axis represents the different regions (or beats) in a sector. Line 340, for example, indicates that the officer is assigned to begin his or her shift at 6:00 a.m. in beat 6. At 7:00 a.m., the officer is scheduled to move to region 7. At 8:00 a.m., the officer is scheduled to move back to beat 6. Line 350, for example, indicates the officer's assignment to beat 8 at 6:00 a.m., beat3 at 7:00 a.m., and beat 4 at 8:00 a.m. prior to the constraints represented by sliders 310a and 310b being imposed. FIG. 3 is an example of the type of display that may be displayed to a supervisor.

Figure 4A:
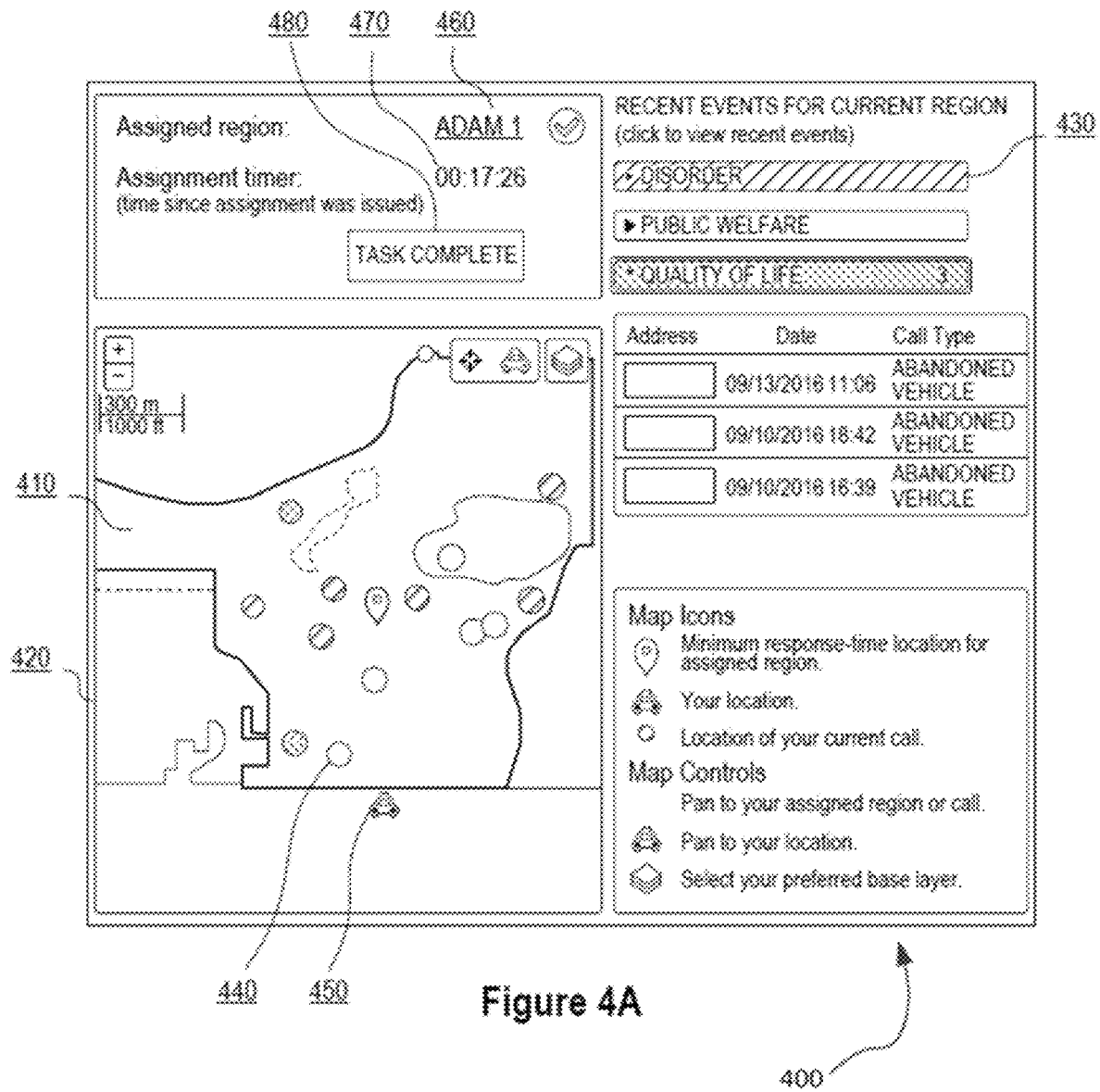
FIG. 4A illustrates a first exemplary assignment display.
Figure 4B:
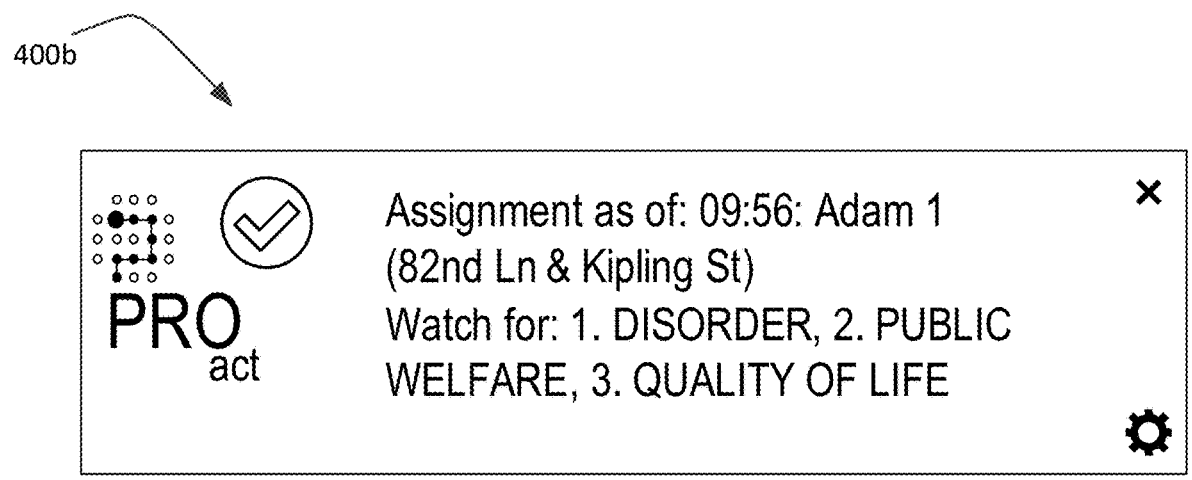
FIG. 4B illustrates a second exemplary assignment display.

In certain embodiments, patrol assignments and their updates may be communicated directly to the relevant patrol officers such as to displays in the officers' vehicles or on their personal mobile devices. FIG. 4A is an example of the type of information that may be displayed to an individual police officer via, for example, text-to-speech systems, or a display such as exemplary assignment display 400, as illustrated in FIG. 4A, and/or exemplary assignment display 400b, as illustrated in FIG. 4B. The assignment display may indicate the region 410 which the patrol officer should patrol using shading on a map 420 and/or with text 460; a list 430 of the types of activity or events the system predicts is most likely to occur and should, therefore, be watched for by the officer; and/or an indicator 440 of where listed predicted events or activities have occurred in the past with respect to the patrol officer's current location 450. In certain embodiments, when an officer receives a patrol assignment, a timer 470 may be displayed to indicate how much time has passed since the assignment was issued. The officer may be given an option to indicate to the system, such as by pressing a button 480, when he or she has completed patrolling the assigned region. In certain embodiments, when the system receives an indication that the patrol has been completed, the system may rerun the solver to determine the next region the officer should patrol without affecting the patrol assignments of other officers.

It will be appreciated that the individual patrol assignments illustrated in FIGS. 4A and 4B may be communicated to relevant patrol officers even if the system is generating a fixed schedule for an entire shift and generating a patrol schedule as illustrated in FIG. 3.

In step 180, the system determines whether to update the patrol schedule. Patrol schedules may need to be updated based on new information available to the system. A new event, or change to event data, for example, may prompt the patrol schedule to be updated. If a patrol officer becomes unavailable, or an additional patrol officer becomes available, for example, the change in the number of available resources may trigger an updating of the patrol schedule and reassignment of resources.

In some embodiments, an indication by either a patrol supervisor or a patrol officer may trigger the generating of a new schedule. A patrol supervisor may trigger a new patrol schedule to be created, for example, to reroute one or more patrol officers at his or her discretion. In some embodiments, a supervisor may trigger a new patrol schedule to be created to respond to an escalation in a request for assistance. After a supervisor indicates an escalation, the system may update patrol schedules to route more personnel to a particular location. In some embodiments, patrol officers may be able to indicate an escalation from the field, which triggers a patrol schedule update and more resources to be sent to the indicated location as back-up.

In some embodiments, a patrol offer can trigger creation of a new patrol schedule by, for example, indicating that they would like a different assignment. A patrol officer may complete an assignment and request a new assignment and/or may request a different assignment before completing an assignment.

In some embodiments, the system may periodically, such as every hour, update patrol schedules to take advantage of new information and/or a newer demand model that may have become available. In some embodiments, the frequency and/or times when the system updates the patrol schedules may be set by the supervisor.

In some embodiments, the updating of patrol schedules may be triggered when the system detects a change in certain information available to it. For example, the system may monitor the data presented to it for updates and, optionally, reassess it according to either preset or user-specified criteria. In at least one embodiment, if the criteria are met, the regeneration of the schedule is "triggered." When the updating of patrol schedules is triggered, the system generates new patrol schedules using the new information (step 160).

In some embodiments, when triggered, the system may receive updated historic demand event data and/or correlative data and generate a new predicted demand model. The new model may then be used to update the schedules in step 160.

In the foregoing, method 100 has been described with reference to a policing scenario, where the system is used to generate optimal patrol schedules for police personnel. One of skill in the art would understand that a same or similar method could be applied to schedule other types of personnel to assignments, particularly ones where personnel respond to events occurring over a geographic area, and the personnel must respond to the events in a timely and optimized manner. Some examples may include, for example, scheduling of fire personnel, ambulances and emergency response personnel, scheduling of medical personnel needed in an emergency to fixed medical facilities, or scheduling of maintenance personnel working for utility companies.

Patrol supervisors and/or other users may want to measure the efficacy of the system. In certain embodiments, a variety of efficacy metrics may be selected by the user seeking this information, such as whether following the generated patrol schedule increased or decreased total event response time. Given the proposed schedule of patrol assignments for an entire year, one may measure performance of the algorithm by simulating what would have occurred had the schedule been followed. Over the course of, for example, a year, the cumulative response time may be recorded. Then, using vehicle GPS data recorded for actual officers in the field over the same period, one may determine the actual officer locations as the events occur and compare their placement with the placement of officers had they been following the proposed optimal schedule. The optimized patrol scheduling may cut the total response time significantly. A patrol supervisor at a police department may use a system to generate such optimized patrol schedules. In certain embodiments, the system may calculate various metrics to help system users determine the system's efficacy.

Figure 5:
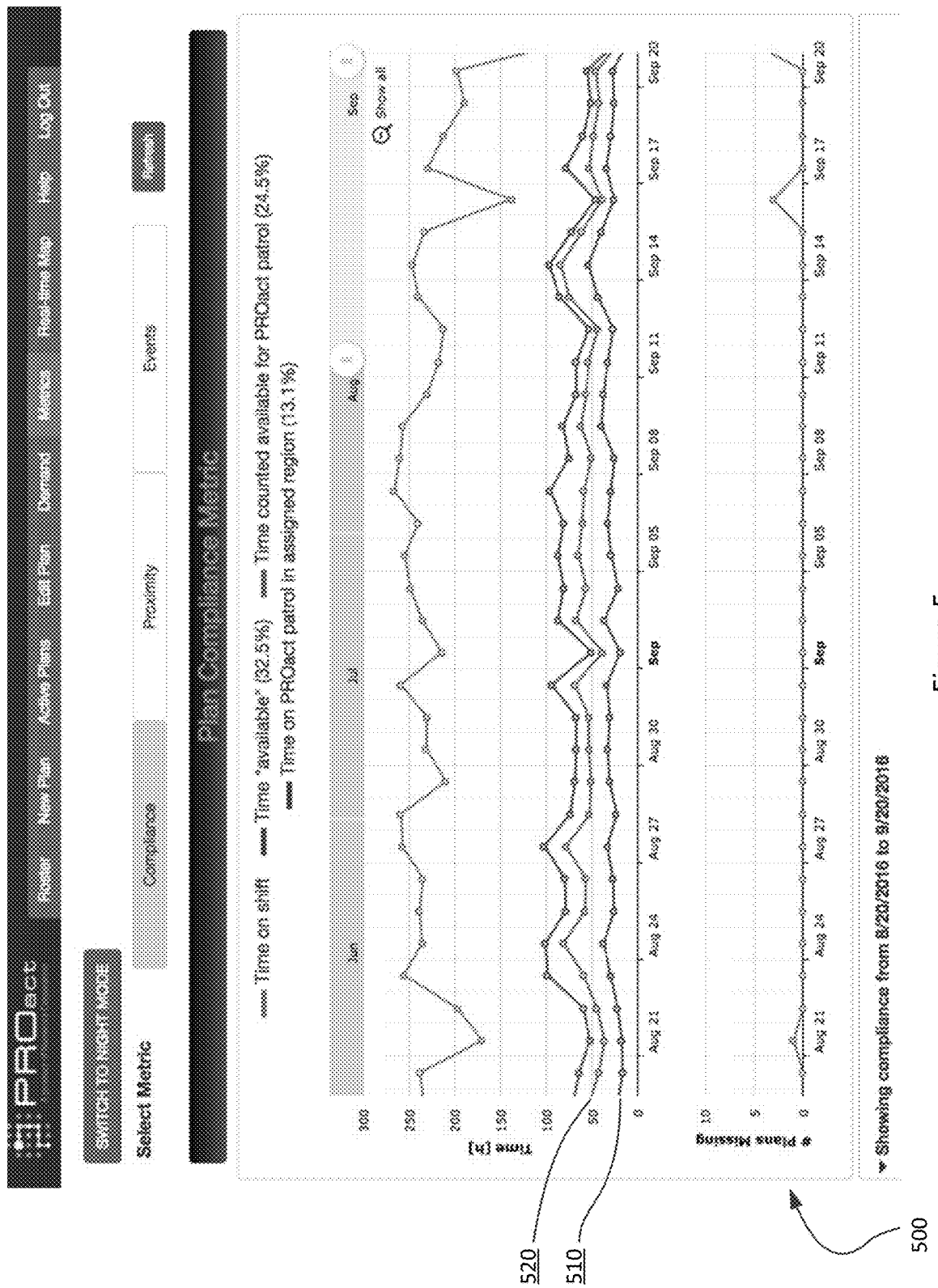
FIG. 5 illustrates an exemplary compliance-data display.
Figure 6:
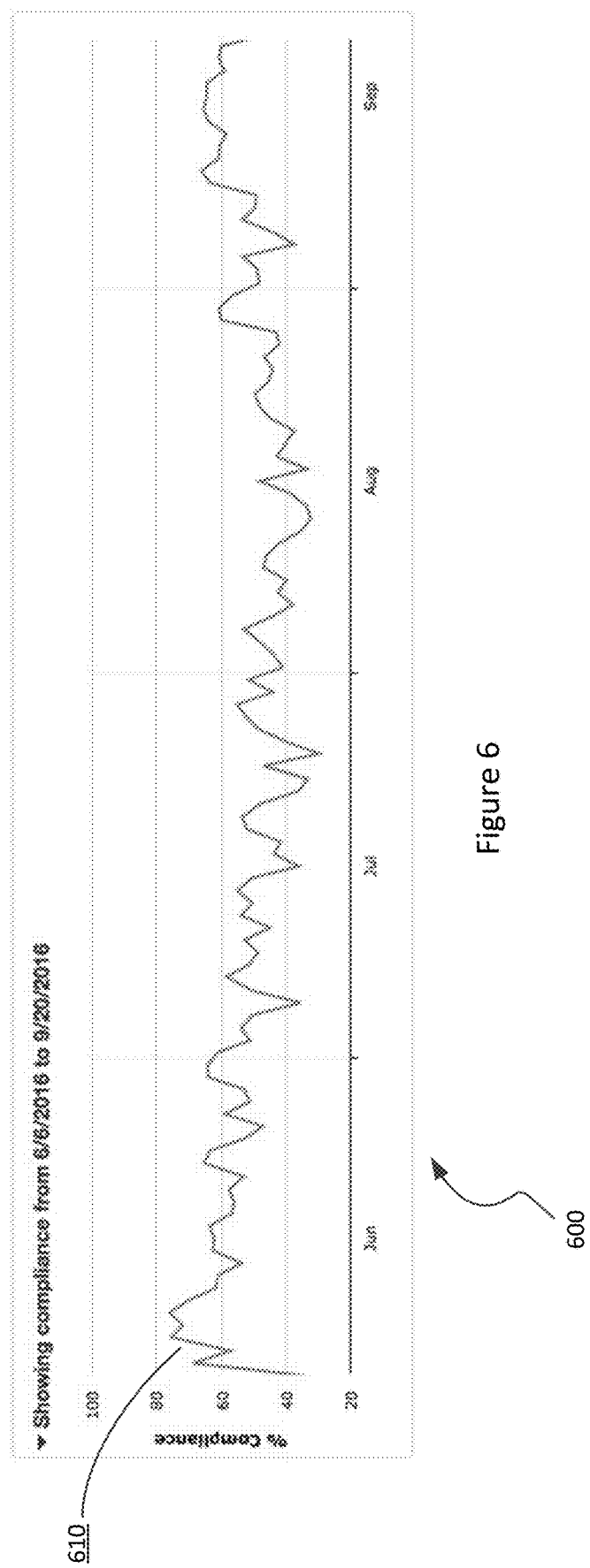
FIG. 6 illustrates an exemplary compliance-value display.

Metrics may be used to determine the degree to which the system was used to affect actual officer patrols, as well as what improvements may be realized if the system was used more by, for example, having patrol officers adhere to assigned patrols more. Such metrics may include, but are not limited to, a measure of patrol-officer compliance with the patrols the system assigned. Such compliance may be measured by, for example, dividing the amount of time patrol officers patrolled assigned regions by the amount of time the patrol officers were available to perform assigned patrols. Under such calculation, compliance takes on a value between 0—indicating no compliance—and 1—indicating perfect compliance. Such metric may be averaged over a particular period of time. An exemplary compliance-data display 500, as illustrated in FIG. 5, may include a graphical plot 510 of the average time patrol officers spent patrolling in a region assigned by the system over a selected period of time. Exemplary compliance-data display 500 may include a graphical plot 520 of the average time patrol officers were available to perform a patrol assigned by the system over a selected period of time. An exemplary compliance-value display 600, as illustrated in FIG. 6, may include a graphical plot 610 indicating the compliance value over time.

Figure 7:
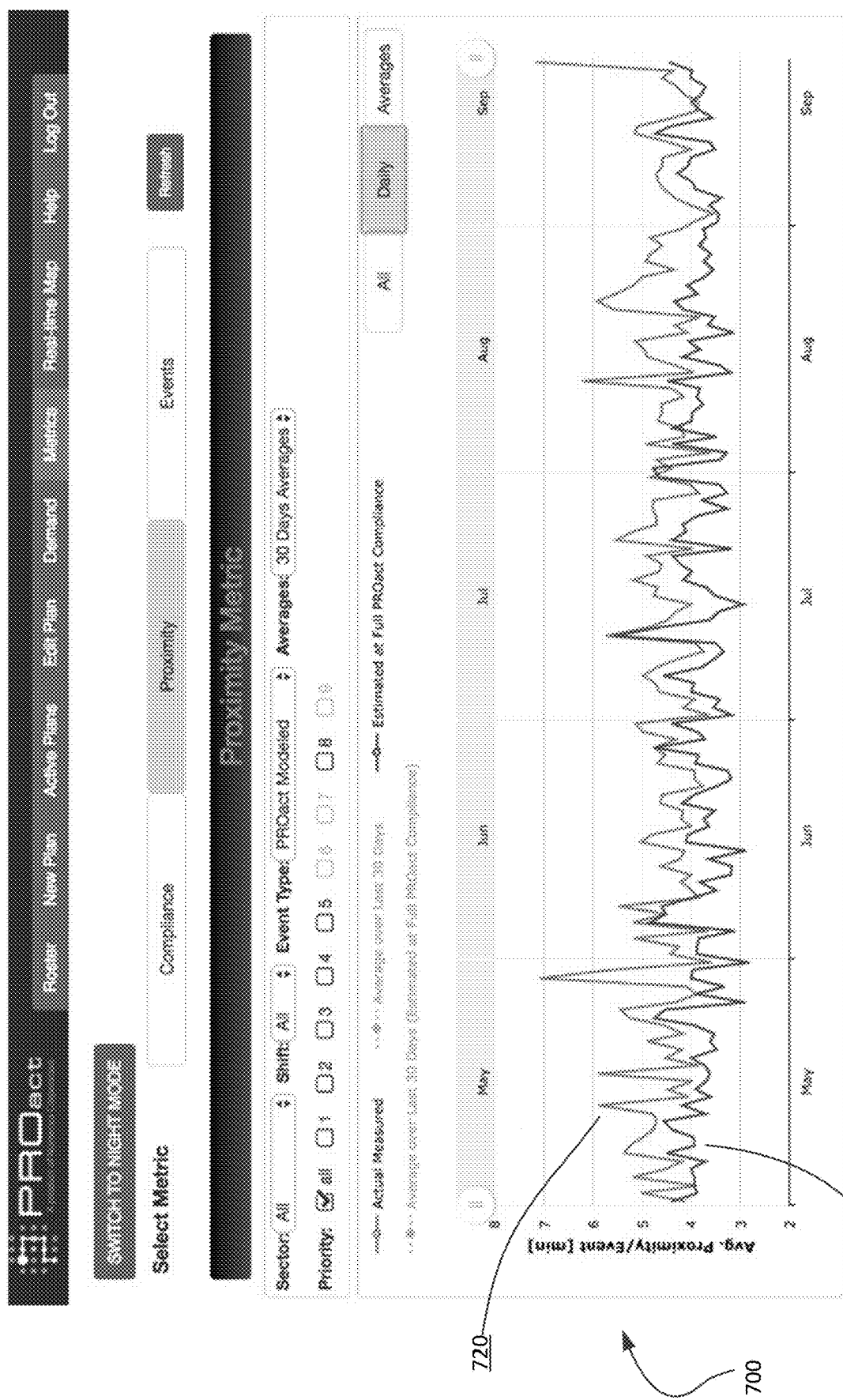
FIG. 7 illustrates an exemplary proximity display.

Another efficacy metric may be the difference between (i) the actual average distance from the origin of a request for police assistance to the nearest patrol officer and (ii) the theoretical distance from the origin of these requests to the nearest patrol officer had all patrol officers been in the regions assigned to them by the system. An exemplary proximity display 700, as illustrated in FIG. 7, may include a graphical plot 710 of the theoretical distance from the origin of requests for police assistance over time to the nearest patrol officer had all patrol officers been in the regions assigned to them by the system at that time. Exemplary proximity display 700 may include a graphical plot 720 of the actual average distance from the origin of a request for police assistance to the nearest patrol officer over time.

Figure 8:
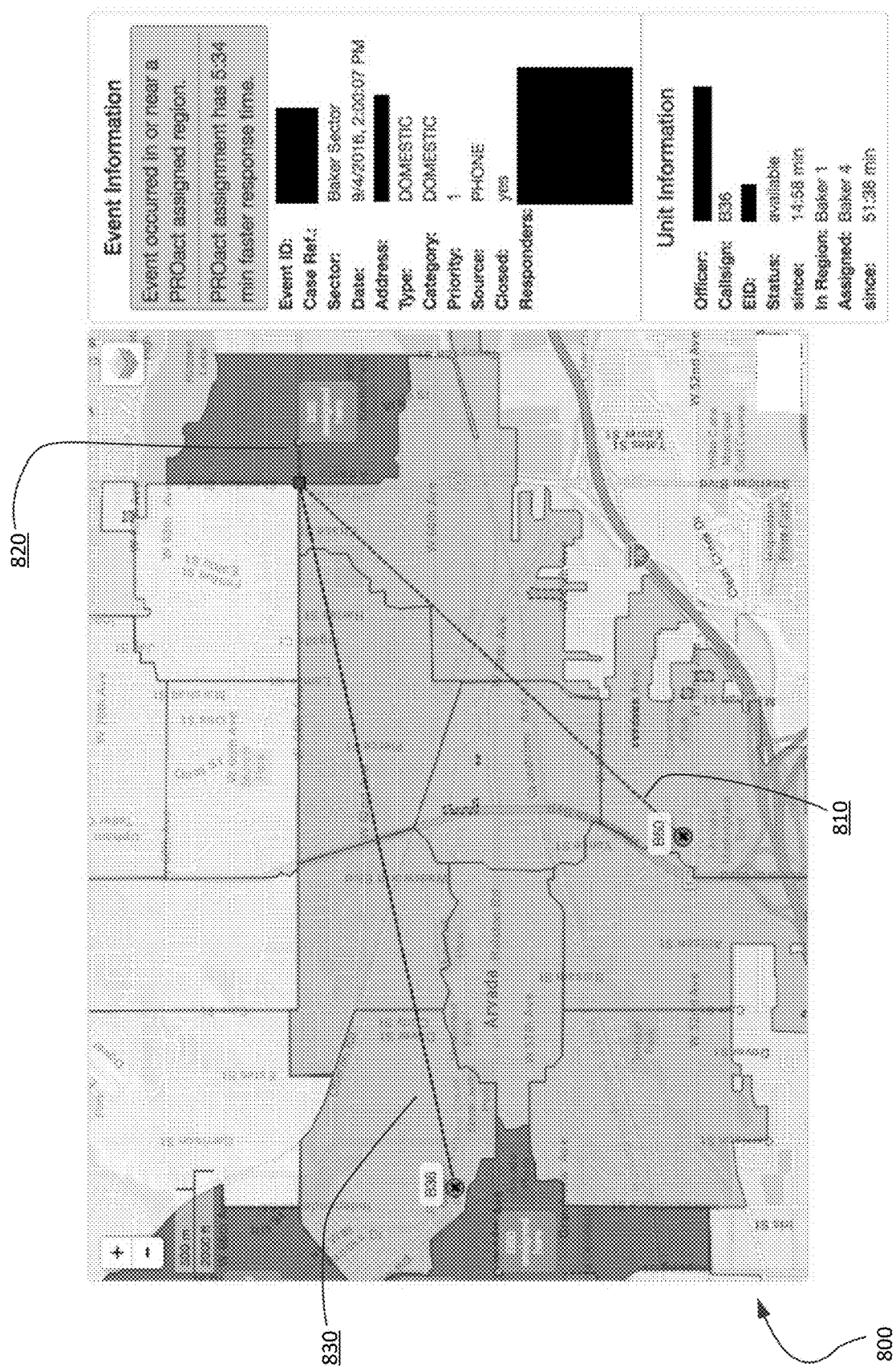
FIG. 8 illustrates an exemplary event map.

Another efficacy metric may be a graphical representation on, for instance, a map for every request for officer assistance (or "event") where the responding patrol officer was at the time of the request; where, had the assignments of the system been adhered to, the would-be nearest officer would be; and where the would-be nearest officer actually was at the time of the request. An exemplary event map 800, as illustrated in FIG. 8, may be displayed with an indicator 810, indicating the distance from the responding patrol officer to the origin of the request at the time of the request. Exemplary map 800 may include an indicator 820, indicating the distance between the nearest officer if the assignments of system had been adhered to—the "would-be nearest officer"—and the origin of the request at the time of the request. Exemplary event map 800 may include an indicator 830, indicating the distance between the would-be nearest officer and the origin of the request at the time of the request.

The system may monitor its status to indicate to one or more users whether, for example, all patrol officers are logged into the system, whether all patrol officers are performing their assigned patrols, and/or whether there are any anomalies in the system operation. The system ay monitor if there are any large fluctuations or other anomalies in the probability of certain events or criminal activity. The system may notify, for example, master user 950 of these anomalies.

Figure 9:
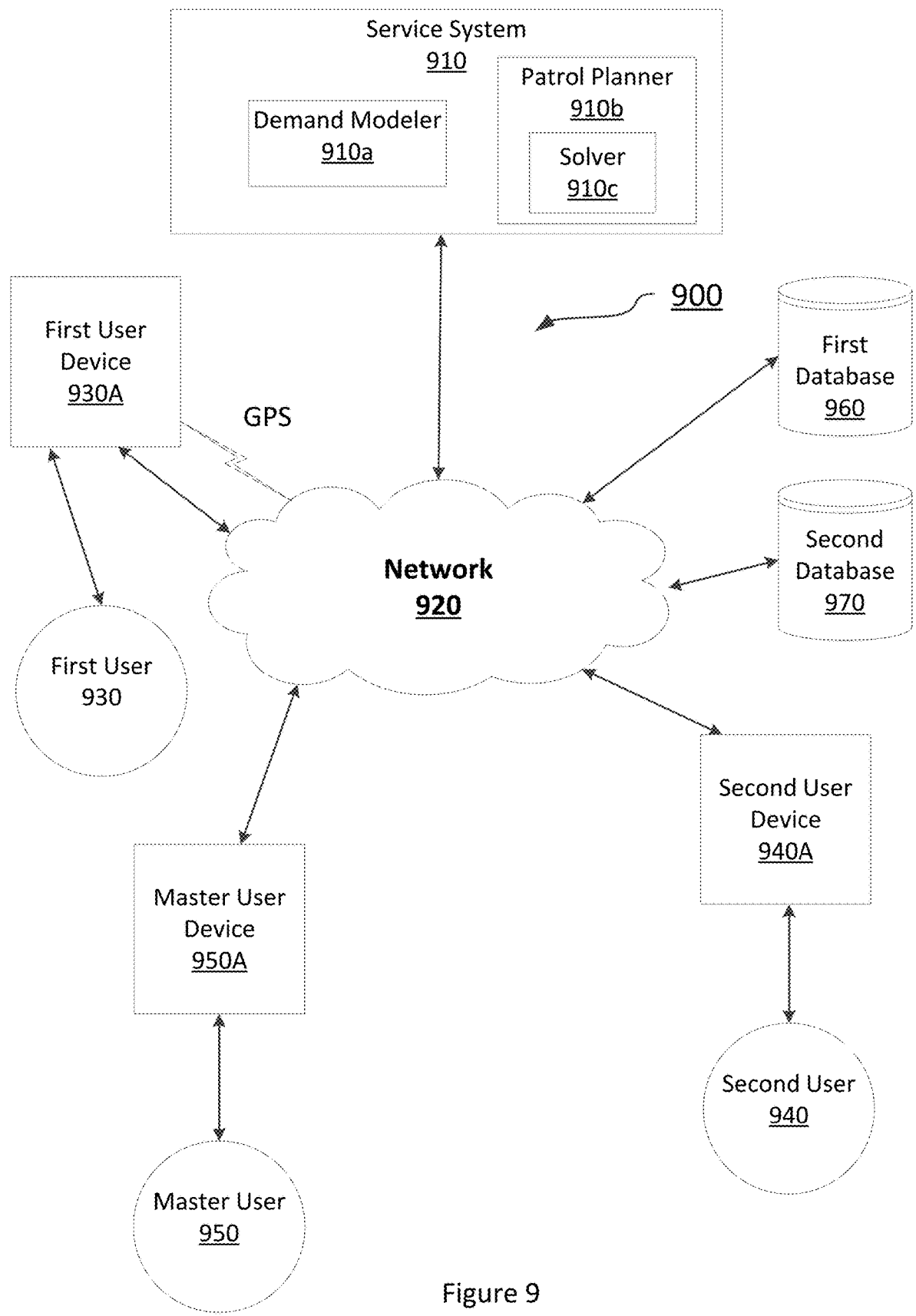
FIG. 9 illustrates an exemplary patrol scheduling system for implementing methods and systems consistent with the present disclosure.

FIG. 9 illustrates an exemplary system for dynamically generating and updating patrol schedules based on historic demand event data and other information. System 900 may include a network 920 to which all devices in the system connect; at least one service system such as service system 910; one or more user devices such as first user device 930A and second user device 940A, operated by at least first user 930 and at least second user 940, respectively; one or more master user device such as master user device 950A, operated by at least master user 950; and one or more databases such as first database 960 and second database 970.

Network 920 may be, for example, a local area network (LAN), a wireless LAN (e.g., a "WiFi" network), a wireless Metropolitan Area Network (MAN) that connects multiple wireless LANs, a wide area network (WAN) (e.g., the Internet), and a dial-up connection (e.g., using a V.90 protocol or a V.92 protocol). In the described embodiments, the Internet may include any publicly-accessible network or networks interconnected via one or more communication protocols, including, but not limited to, hypertext transfer protocol (HTTP) and transmission control protocol/internet protocol (TCP/IP). The electronic network may optionally include one or more mobile device networks, such as a GSM network or a PCS network, that allow mobile devices to send and receive data via applicable communications protocols, including those described above. Further, the system may operate and/or interact with one or more host servers and one or more user devices for the purpose of implementing features described herein.

Service system 910 may comprise server systems, databases, and/or computing systems configured to receive information from devices in the network 920, process the information, and communicate this or other information to other entities in the network 920, such as first user device 930A and second user devices 940A. The service system 910 may be configured to receive data over a network (such as an electronic network), process and analyze data and queries, and/or provide geographic locations to users. Network 920 may comprise any suitable network such as the Internet, a wide area network, or any other network that permits exchange of information between various components of the system. The service system may communicate with smartphones or other portable devices carried by end users. Service system may further comprise a demand modeler 910a. Demand modeler 910a may perform operations necessary to create one or more predicted-demand models from historic demand event data and/or correlative data. Service system may further comprise a patrol planner 910b, which includes a solver 910c. After the patrol planner 910b receives input data, such as constraints imposed by a shift supervisor, solver 910c may use the input data and the predicted-demand model to generate patrol schedules.

In an embodiment, master user 950 may be one or more people—such as a patrol supervisor—seeking to create a patrol schedule based on historic demand event data and to fulfill one or more patrol objectives, such as maximizing neighborhood policing, wherein the time since a police officer was last assigned to a particular neighborhood is minimized. Master user 950 may use master user device 150A to access the service system 910 over network 920 and indicate which patrol officers master user 150 would like to create a schedule for, and, optionally, what patrol objectives (e.g., neighborhood policing) master user 950 would like to achieve. Master user 150 may indicate how much he or she is willing to compromise on one or more patrol objectives. Master user 150 may rank the patrol objectives or assign a quantity proportional to his or her desire to achieve one or more objective to the one or more objectives. Master user 150 may indicate certain constraints (e.g., that a certain police officer should be in a particular geographic area or patrol a particular region at a particular time).

In certain embodiments, service system 910 determines the patrol schedule by analyzing, according to the aforementioned methods, data derived from first database 960 and/or second database 970. The patrol schedule may then be sent over network 920 to any and all of the master user device 950A, first user device 930A, and second user device 940A. First user 930 and second user 940 may be police officers who have been assigned a patrol schedule based on the outputted schedule. In certain embodiments, a user device, such as first user device 930A, may determine its geographic location using the Global Positioning System (GPS) and communicate its geographic position to service system 910 over network 920, or, in an embodiment, to the first database 960 or second database 970. Service system 910 may take first user's 930 position into account when determining the patrol schedule.

In certain embodiments, master user 950 may indicate which geographic sector the police officers will patrol and create a patrol schedule for this sector. This sector may be subdivided into smaller geographic sections, or "regions," The service system 910 may assign the various police officers to patrol certain regions at certain times in order to best fulfill master user's 950 patrol objectives. In certain embodiments, a patrol objective may be to minimize police officer response times to requests for police assistance. To do so, in certain embodiments, service system 910 may attempt to predict the likelihood that a request for police assistance will originate from a particular region at a particular time and attempt to create an optimal patrol schedule such that police officers are patrolling inside or closest to the regions that are most likely to have requests for police assistance originate in them at such time. In certain embodiments, the response time may be just one of many patrol objectives, and service system 910 may adjust the schedule accordingly (i.e., to properly balance the quantified desires master user 950 indicated for achieving each patrol objective). The predictions by service system 910 are made by analyzing data contained within databases 960 and 970 in accordance with the aforementioned methods. The data analyzed may include historic requests for law enforcement service (e.g., citizen-initiated calls), CAD data describing the number of officers who responded to each call over time, AVL data to learn traffic models or deterrence, records management system (RMS) data to obtain estimated event times (distinct from report times available from CAD data), a road network within a geographic area, historic weather data, the date of various holidays and community events, the lunar phase, various demographic information, etc.

Figure 10:
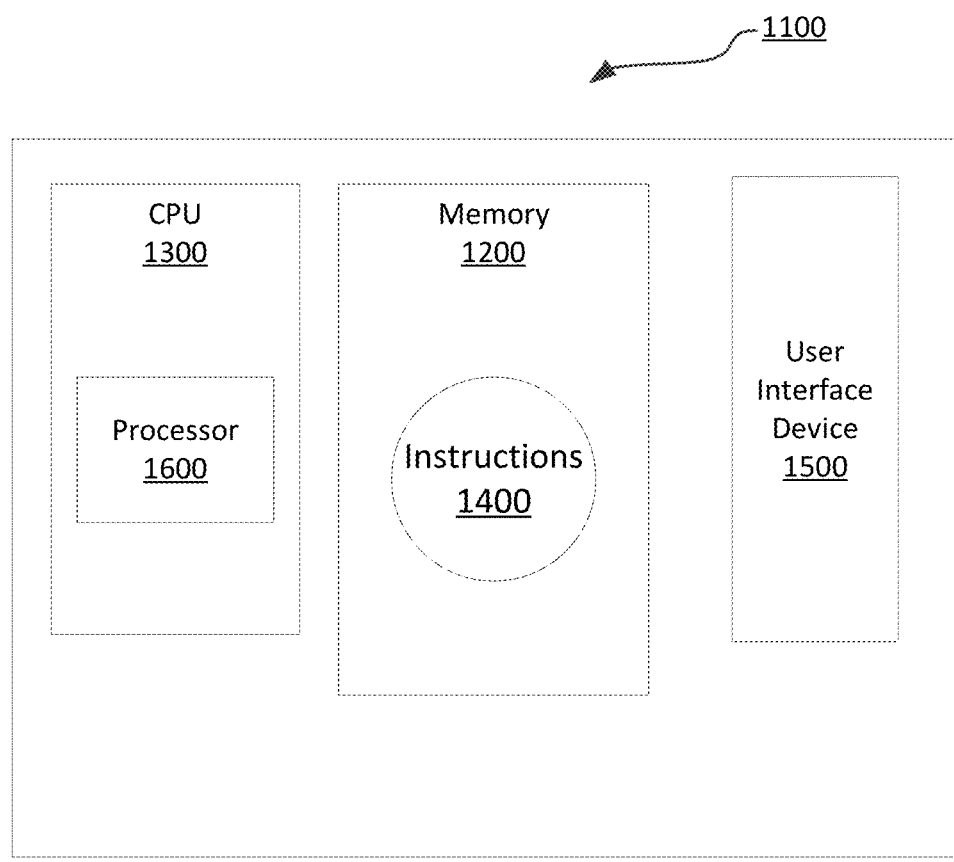
FIG. 10 illustrates an exemplary system for generating patrol schedules.

The components of system 900, illustrated in FIG. 10 as exemplary system 1100, may include any combination of an assembly of hardware, software, and/or firmware, including a memory 1200, and a central processing unit ("CPU") 1300. Memory 1200 may include any type of RAM or ROM embodied in a physical storage medium, such as magnetic storage including floppy disk, hard disk, or magnetic tape; semiconductor storage such as solid state disk (SSD) or flash memory; optical disc storage; and/or magneto-optical disc storage. CPU 1300 may include one or more processors, such as processor 1600, for processing data according to a set of programmable instructions 1400 or software stored in the memory 1200. The functions of CPU 1300 may be provided by a single dedicated processor 1600 or by a plurality of processors. Moreover, processors may include, without limitation, digital signal processor (DSP) hardware, or any other hardware capable of executing software. System 1100 may comprise one or more user interface devices 1500, such as a display, printer, monitor, keyboard, touch screen, stylus, speaker, text-to-speech system, microphone, and/or mouse.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for dynamically generating and updating a patrol schedule for a shift, the system comprising:
    one or more storage mediums storing executable instructions; and
    one or more processors configured to execute the instructions, wherein
    execution of the instructions causes the system to perform a method comprising:
        receiving historic demand event data comprising information representing at least one prior incident for which patrol personnel were requested, such information representing at least one prior incident comprising, for each at least one prior incident, a location type and an incident type,
        generating, by a processor of the one or more processors, a predicted-demand model configured to predict when and where future incidents will take place and how many patrol personnel will be needed to respond to each future incident by:
            analyzing, by a machine learning algorithm, the historic demand event data;
            generating, based on the analysis, one or more feature vectors; and
            identifying a correlation between a feature vector and an incidence rate,
        receiving information associated with at least one patrol officer assigned to the shift, wherein the information associated with the at least one patrol officer comprises at least one constraint on the at least one patrol officer's availability,
        generating, by the processor, a patrol schedule for a shift based on (i) the historic demand event data, (ii) the predicted-demand model, and (iii) the information associated with the at least one patrol officer assigned to the shift, wherein the patrol schedule comprises at least one patrol assignment for the at least one patrol officer assigned to the shift,
        optimizing the patrol schedule based on at least one policing objective and on the at least one constraint,
        outputting the optimized patrol schedule to at least one device for use by the at least one patrol officer assigned to the shift for patrolling a sector, wherein the optimized patrol schedule comprises, for each patrol officer, a sequence of geographic regions to be visited and a corresponding sequence of durations that specify how much time should be spent patrolling each geographic region,
        receiving real-time information for the at least one police officers on the shift,
        monitoring the received real-time information for a trigger to initiate a patrol shift schedule update;
        automatically updating the optimized patrol schedule based on the real-time information, wherein updating the optimized patrol schedule comprises:
            generating a second patrol schedule for a shift based on (i) the historic demand event data, (ii) the predicted-demand model, and (iii) the real-time information associated with the at least one patrol officer; and
            optimizing the second patrol schedule based on the at least one policing objective and the at least one constraint, and
        transmitting, to a device associated with an officer, the updated patrol schedule.

2. The system of claim 1, wherein the patrol schedule is optimized based multiple policing objectives and the multiple policing objectives are weighted to reflect relative importance.

3. The system of claim 1, wherein the method further comprises updating the patrol schedule based on a change in at least one of the at least one constraints.

4. The system of claim 3, wherein the change in the at least one constraint comprises a change in availability of one or more patrol officers.

5. The system of claim 3, wherein the change in the at least one constraint comprises a request from a patrol officer for a different patrol assignment.

6. The system of claim 1, wherein the predicted-demand model generated based on the historic demand event data is specific to a particular geographic area and is generated based on historic demand event data for that particular geographic area.

7. The system of claim 6, wherein the geographic area is partitioned into patrol regions, the patrol regions having been determined based on road information, the historic demand event data, and neighborhood information.

8. The system of claim 7, wherein the geographic area is partitioned into two or more patrol regions, the patrol regions determined automatically based on road information, the historic demand event data, and neighborhood information and such that at least one objective is satisfied, wherein the at least one objective is chosen from the group comprising: 1) the boundary lengths between regions are minimized, 2) the sizes of the regions are balanced in terms of number of historical incidents within each region; and 3) each region is road-connected such that any point of a region can be reached by vehicle on roads.

9. The system of claim 1, wherein generating the patrol schedule for the shift further comprises generating the patrol schedule based at least in part on correlative data related to the historic demand event data.

10. The system of claim 1, wherein outputting the patrol schedule for use by the at least one patrol officer comprises outputting the at least one patrol assignment for a patrol officer to a mobile display that travels with the patrol officer while on patrol.

11. The system of claim 10, wherein the system further outputs actionable information related to the region of assigned patrol, persons of interest in the region, addresses of frequent criminal activity, or types of incidents likely to occur in the region.

12. The system of claim 11, wherein the actionable information displayed is determined based on the location of the patrol officer or the patrol officer's vehicle, as determined by at least one location acquisition system.

13. The system of claim 1, wherein the information associated with the at least one patrol officer assigned to the shift comprises an indication of interruptibility, the indication representing the likelihood that the patrol officer will be reassigned upon occurrence of a new incident.

14. The system of claim 1, wherein the method further comprises updating the patrol schedule periodically.

* * * * *